US012687906B2

(12) United States Patent
Yuan et al.

(10) Patent No.: US 12,687,906 B2
(45) Date of Patent: Jul. 21, 2026

(54) METHOD FOR OPTIMIZING COMPUTING POWER OF NEURAL NETWORK MODULE, CHIP, ELECTRONIC DEVICE AND MEDIUM

(71) Applicant: Beijing Youzhuju Network Technology Co., Ltd., Beijing (CN)

(72) Inventors: Hangjian Yuan, Beijing (CN); Liyang Liu, Beijing (CN); Dongming Yang, Beijing (CN); Yunfeng Shi, Beijing (CN); Jian Wang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/013,433

(22) Filed: Jan. 8, 2025

(65) Prior Publication Data

US 2025/0147564 A1     May 8, 2025

Related U.S. Application Data

(63) Continuation of application No. PCT/CN2023/107008, filed on Jul. 12, 2023.

(30) Foreign Application Priority Data

Jul. 15, 2022     (CN) .......................... 202210835887.0

(51) Int. Cl.
  *G06F 1/26*          (2006.01)
  *G06N 3/063*         (2023.01)
(52) U.S. Cl.
  CPC ............... *G06F 1/26* (2013.01); *G06N 3/063* (2013.01)
(58) Field of Classification Search
  CPC ................................... G06F 1/26; G06N 3/063
    (Continued)

(56) References Cited

U.S. PATENT DOCUMENTS

2015/0089484 A1    3/2015   Halambi et al.
2020/0134400 A1    4/2020   Liu et al.

FOREIGN PATENT DOCUMENTS

CN         110929862 A      3/2020
CN         111338635 A      6/2020
         (Continued)

OTHER PUBLICATIONS

Compiling And Optimizing Neural Nets by Moyer, https://semiengineering.com/compiling-and-optimizing-neural-nets/ (Year: 2020).*

(Continued)

*Primary Examiner* — Austin Hicks
(74) *Attorney, Agent, or Firm* — BakerHostetler

(57)     ABSTRACT

A method for optimizing computing power of a neural network module, a chip, an electronic device, and a medium are provided. The method includes: obtaining, by the chip, a computational graph of the neural network module having respective operators; performing at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out; determining a second operator adjacent to the adjusted first operator in the computational graph according to the specific operations of each operator; and performing merge or cancellation, by the chip, on the adjusted first operator and the second operator.

16 Claims, 14 Drawing Sheets

(58) Field of Classification Search
USPC .......................................................... 706/15
See application file for complete search history.

(56) References Cited

FOREIGN PATENT DOCUMENTS

| | | | | | |
|---|---|---|---|---|---|
| CN | 111401538 | A | | 7/2020 | |
| CN | 111401539 | A | * | 7/2020 | ............. G06N 3/063 |
| CN | 112465123 | A | * | 3/2021 | ............... G06N 3/04 |
| CN | 112579063 | B | | 6/2021 | |
| CN | 113449858 | A | | 9/2021 | |
| JP | 2021-501377 | A | | 1/2021 | |

OTHER PUBLICATIONS

International Patent Application No. PCT/CN2023/107008; Int'l
Search Report and Written Opinion; dated Sep. 8, 2023; 5 pages.
European Patent Application No. 23838981.1; Extended Search
Report; dated Jul. 23, 2025; 10 pages.
Gosmann et al.; "Automatic Optimization of the Computation
Graph in the Nengo Neural Network Simulator"; Frontiers in
Neuroinformatics; vol. 11; May 2017; 11 pages.
Li et al.; "The Deep Learning Compiler: A Comprehensive Survey";
arXiv:2002.03794; Feb. 2020; 36 pages.
Hall et al.; "HPIPE: Heterogeneous Layer-Pipelined and Sparse-
Aware CNN Inference for FPGAs"; arXiv:2007.10451; Jul. 2020;
10 pages.
Japan Patent Application No. 2025-501553; Notice of Reasons for
Refusal; dated Nov. 18, 2025; 8 pages.

* cited by examiner

Figure 2:
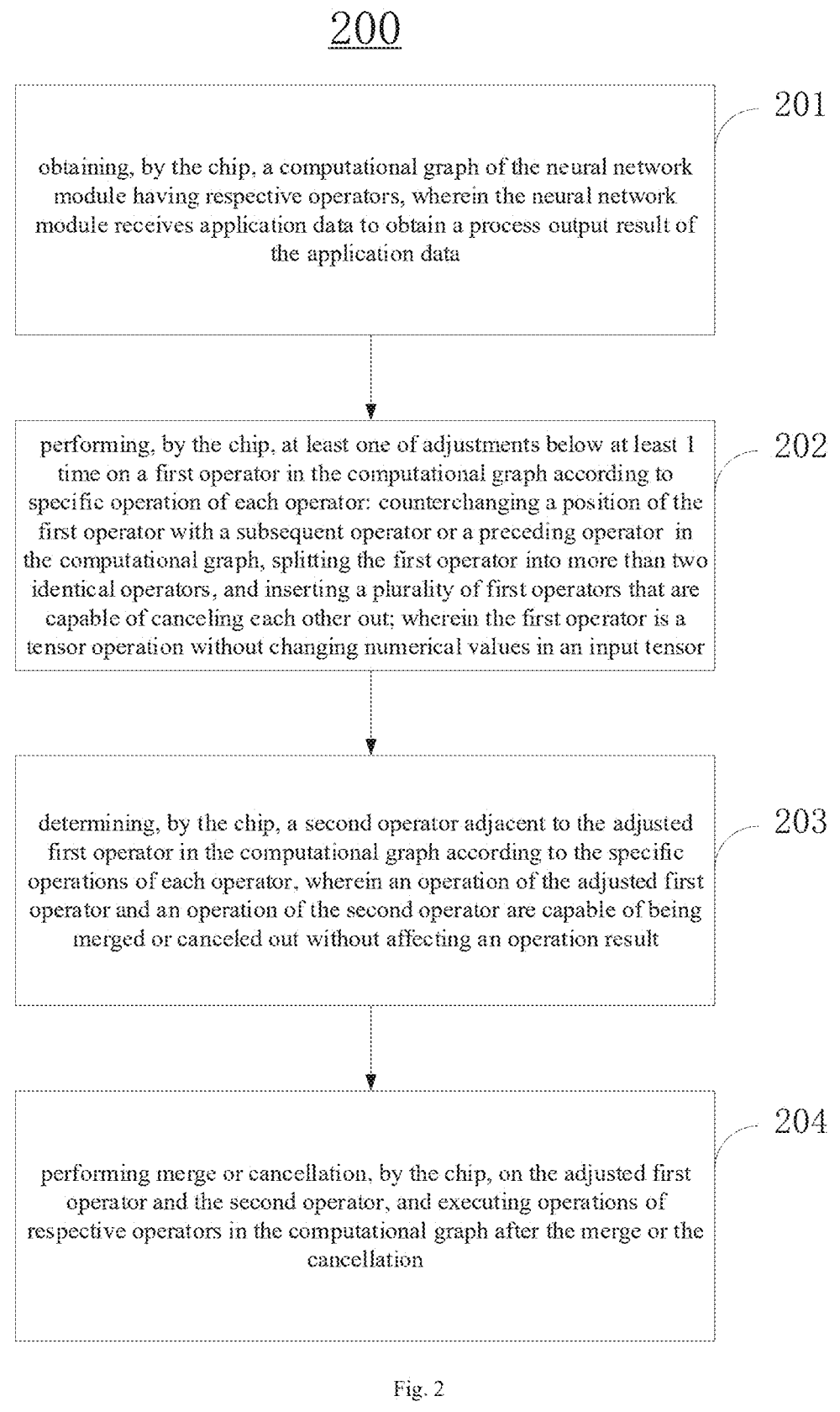

200 obtaining, by the chip, a computational graph of the neural network
module having respective operators, wherein the neural network
module receives application data to obtain a process output result of
the application data

— 201 performing, by the chip, at least one of adjustments below at least 1
time on a first operator in the computational graph according to
specific operation of each operator: counterchanging a position of the
first operator with a subsequent operator or a preceding operator in
the computational graph, splitting the first operator into more than two
identical operators, and inserting a plurality of first operators that are
capable of canceling each other out; wherein the first operator is a
tensor operation without changing numerical values in an input tensor

— 202 determining, by the chip, a second operator adjacent to the adjusted
first operator in the computational graph according to the specific
operations of each operator, wherein an operation of the adjusted first
operator and an operation of the second operator are capable of being
merged or canceled out without affecting an operation result

— 203 performing merge or cancellation, by the chip, on the adjusted first
operator and the second operator, and executing operations of
respective operators in the computational graph after the merge or the
cancellation

METHOD FOR OPTIMIZING COMPUTING POWER OF NEURAL NETWORK MODULE, CHIP, ELECTRONIC DEVICE AND MEDIUM

The present application is a continuation of International Patent Application No. PCT/CN2023/107008, filed on Jul. 12, 2023, which claims priority of Chinese Patent Application No. 202210835887.0 filed on Jul. 15, 2022, the entire contents disclosed by the Chinese patent application are hereby incorporated by reference.

TECHNICAL FIELD

The present disclosure relates to a field of neural networks, and more specifically, to a method for optimizing computing power of a neural network module, a chip, an electronic device, and a medium.

BACKGROUND

An artificial intelligence (AI) chip is a chip dedicated to neural network operations, a specially designed chip mainly for accelerating neural network execution.

The neural network may be expressed by using pure mathematical formulas. According to these mathematical formulas, the neural network may be represented by using a computational graph model. The computational graph is a visual representation of these mathematical formulas. The computational graph model may split a composite operation into a plurality of sub-operations; and each sub-operation is referred to as an operator (Op). The computational graph consists of nodes and edges. A node represents an operator, while an edge represents a dependency relationship between computations. A solid line represents a data transfer dependency relationship, and the transferred data is a tensor. A dashed line may usually represent control dependency, that is, an execution order.

In the computational graph, an operator has its own input data; and different operators have different operation logics; each operator uses input data to output operated output data according to its own operation logic.

A chip that accelerates the execution speed of a computational graph of a neural network and optimizes the computing power of a neural network module needs to be designed.

SUMMARY

A method for optimizing computing power of a neural network module through a chip is provided, including: obtaining, by the chip, a computational graph of the neural network module having respective operators, wherein the neural network module receives application data to obtain a process output result of the application data; performing, by the chip, at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out; wherein the first operator is a tensor operation without changing numerical values in an input tensor; determining, by the chip, a second operator adjacent to the adjusted first operator in the computational graph according to the specific operations of each operator, wherein an operation of the adjusted first operator and an operation of the second operator are capable of being merged or canceled out without affecting an operation result; and performing merge or cancellation, by the chip, on the adjusted first operator and the second operator, and executing operations of respective operators in the computational graph after the merge or the cancellation.

An artificial intelligence chip is provided, including: a memory, configured to store received application data to be input into a computational graph of a neural network module having respective operators to obtain a process output result of the application data; a controller, configured to: perform at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out; wherein the first operator is a tensor operation without changing numerical values in an input tensor; determine a second operator adjacent to the adjusted first operator in the computational graph according to specific operations of respective operators, wherein an operation of the adjusted first operator and an operation of the second operator are capable of being merged or canceled out without affecting an operation result; and perform merge or cancellation, by the chip, on the adjusted first operator and the second operator, and execute operations of respective operators in the computational graph after the merge or the cancellation.

An electronic device for optimizing computing power of a neural network module through a chip is provided, including: a memory, configured to store instructions; a processor, configured to read instructions in the memory and execute the method according to the present disclosure.

A non-temporary storage medium is provided, having instructions stored thereon, wherein, the instructions, when read by a processor, cause the processor to execute the method according to the present disclosure.

BRIEF DESCRIPTION OF DRAWINGS

In order to more clearly explain the embodiments of the present disclosure or the technical solutions in the prior art, the drawings needed in the description of the embodiments or the prior art will be briefly introduced below. Obviously, the drawings in the following description are only some embodiments of the present disclosure, and other drawings can be obtained according to these drawings without creative work for ordinary people in the field.

FIG. 2 shows a method for optimizing computing power of a neural network module through a chip according to an implementation of the present disclosure.

DETAILED DESCRIPTION

Figure 1:
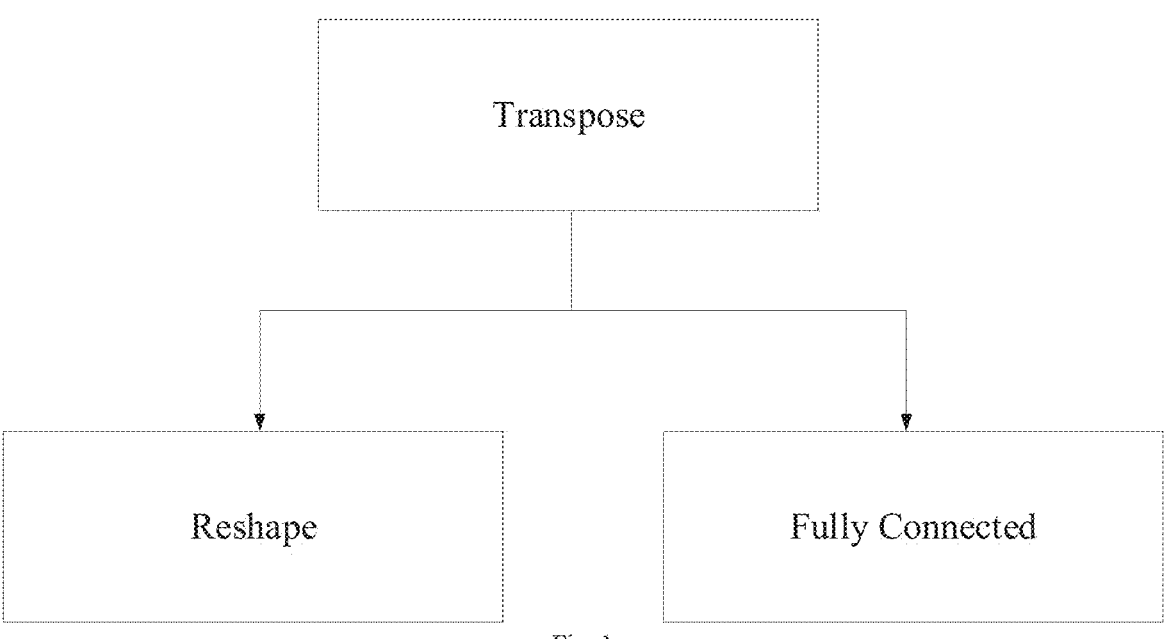
FIG. 1 shows an example diagram of a computational graph in a neural network applied to image data processing and recognition according to an implementation of the present disclosure.

References are now be made in detail to specific embodiments of the present application, examples of which are illustrated in the accompanying drawings. Although the application is described in connection with specific embodiments, it will be understood that it is not intended to limit the application to the described embodiments. On the contrary, it is intended to cover changes, modifications, and equivalents included within the spirit and scope of this application as defined by the appended claims. It should be noted that the method steps described herein can be realized by any functional block or functional arrangement, and any functional block or functional arrangement can be realized as a physical entity or a logical entity, or a combination of both.

It can be understood that before using the technical solutions disclosed in various embodiments of this disclosure, users should be informed of the types, scope of use, use scenarios, etc., of personal information involved in this disclosure in an appropriate way according to relevant laws and regulations and be authorized by users.

For example, in response to receiving an active request from a user, a prompt message is sent to the user to clearly remind the user that the operation to be executed as requested by the user will require acquiring and using the personal information of the user. Thus, according to the prompt information, the user may autonomously choose whether to provide personal information to software or hardware such as an electronic device, an application, a server, or a storage medium that executes the operation of the technical solution of the present disclosure.

As an optional but non-restrictive implementation, in response to receiving an active request from a user, a prompt message may be sent to the user through a pop-up window, where a prompt message may be presented in text. In addition, the pop-up window may also carry a selection control for the user to choose whether to "agree" or "disagree" to provide personal information to an electronic device.

It may be understood that the above-described processes of informing and acquiring user authorization are only illustrative and do not constitute a limitation on the implementation of the present disclosure; other modes that meet relevant laws and regulations may also be applied to the implementation of the present disclosure.

It may be understood that the data involved in the technical solution (including but not limited to the data per se, acquisition, or use of data) should comply with the requirements of corresponding laws, regulations, and relevant stipulations.

Currently, a neural network or a machine learning system uses a tensor as a basic data structure. A core of the concept of tensor rests in that a tensor is a data container, and data contained thereby is almost always numerical data, making the tensor a container of numbers. A specific numerical value in the tensor may be application data, for example, including image data, natural language data, and so on.

For example, a scalar is a zero-axis tensor, for example, 2, 3, 5. In a specific application scenario, for example, image data: 2, for example, represents a grayscale value of a pixel in the image data; 3, for example, represents a grayscale value of a pixel in the image data; and 5, for example, represents a grayscale value of a pixel in the image data, etc. For example, a vector is a one-axis tensor, for example, [0, 3, 20], and a matrix is a two-axis tensor, for example, $$\begin{bmatrix} 2 & 3 \\ 1 & 5 \end{bmatrix}$$

or [[2,3], [1,5]]. For example, there may also be three-axis tensors (e.g., a: (shape: (3, 2, 1)), [[[1],[2]],[[3],[4]],[[5], [6]]]), four-axis tensors, and so on. These tensors may all be used to represent data in specific application scenarios, for example, image data, natural language data, and so on. Neural network functions targeting these application data may include image recognition (e.g., inputting image data to recognize what the animal contained in the image is), natural language recognition (e.g., inputting language of a user to recognize the user's intention to speak, for example, whether the user is speaking to open a music player), and so on.

The recognition process for the above-described application scenarios may be implemented by the neural networks receiving various input application data as tensors and computing the same through the neural networks. As illustrated above, the computation of the neural network may be composed of a series of tensor operations; and these tensor operations may be complex geometric transformations of input data for several axes of tensors. These tensor operations may be referred to as operators; and the neural network computation may be transformed into a computational graph, wherein, the computational graph has a plurality of operators; and the plurality of operators may be connected by edges, representing dependency relationships between computations of the respective operators.

Types of operators may include activation-class operators (e.g., Relu operator, sigmoid operator, Tan operator); two-tensor computation-class operators (e.g., BiasAdd operator (for adding a bias operation), MatMul operator (matrix multiplication), Axpy operator (vector summation)); multi-Tensor computation-class operators (e.g., EltwiseOp operator (one of operations of multiplying, adding, and taking a maximum value of elements in corresponding positions of the plurality of Tensors); normalization-class operators (e.g., BatchNorm operator (for accelerating a training convergence speed of a neural network), LRN operator (i.e., local response normalization), SsdNormalize operators (which limits a range of one-time normalization); feature-extraction-class operators (Convolution operator (feature value extraction by region), Fully connected operator (feature extraction with entire input as a feature map), Correlation operator, DeConvolution operator (for mapping a low-axis space to a high-axis space while keeping connectivity/patterns therebetween), DepConvolution operator (for completing computation of an ordinary 3D kernel by using a step-by-step computing method); anti-overfitting-class operators (e.g., Pooling operator (for partitioning an input image into several rectangular regions, and outputting a maximum value or an mean value for each sub-region), Mean operator (a sliding window operator having only a function of taking a mean value); axis-transformation-class operators (e.g., Flatten operator (for merging, in an input tensor, a start-axis to an end-axis into one axis), Reshape operator (for converting input Tensor description into a new shape), FreespaceExtract operator (for changing h-axis into 1 while keeping other axes unchanged, thereby completing sampling of h, h being a positive integer), Pack operator (for transforming a tensor array with an axis of R into a tensor with an axis of R+1), Pad operator (for data expansion), Permute operator (for adjusting an input axis order of Tensor), ShuffleChannel (for adjusting sorting of C-axis), Title operator (for copying input data a specified number of times on each axis to generate output data), transpose operator (for transposing, changing a sorting order of values in a tensor), reshape operator (for transforming a tensor into a tensor of other shape), broadcast operator (for expanding the input tensor to another tensor), gather operator, reverse operator, concat operator (for concatenating a plurality of operators), cast operator, and so on. In addition, users may also customize some operators. Since there are too many types of operator names and specific operations, the types and names of all operators as well as corresponding operations will not be exemplified here one by one.

In the prior art, after obtaining a computational graph of a neural network, these operators are usually sequentially operated according to the operators given in the computational graph and edges between the operators, to obtain a final computation result. However, it takes a certain amount of time to compute each operator; and in the prior art, these operators are not optimized to accelerate operation speed thereof and reduce the operation time of the operators.

When studying operators in a computational graph of a neural network for processing image data, it is found that some operators per se, or those up-shifted or down-shifted, due to specific operational content thereof, may be merged or canceled out with operations of other operators, to optimize these operators, reduce the number of operators to be computed or reduce computational complexity of operator operations, and shorten, for example, real-time running latency of the neural network for processing image data on the chip. In addition, certain specific hardware reading functions of an artificial intelligence chip developed by an applicant may be combined, to ensure a computation result is consistent with a computation result of these operators before optimization while reducing the number of operators to be computed or reducing computational complexity of operator operations. Such optimization is performed based on such a high level of semantic expression as a computational graph, avoiding some complex and tedious optimization work at an instruction level, and making optimizable scenarios more universal.

FIG. 1 shows an example diagram of a computational graph in a neural network applied to image data processing and recognition according to an implementation of the present disclosure.

For example, a tensor carrying image data (e.g., chromaticity values of pixels) is input into an exemplary computational graph shown in FIG. 1. The computational graph only shows some operators according to the implementation of the present disclosure for convenience of browsing by a reader. The operation process of the computational graph is: firstly, the tensor is subjected to Transpose operator computation, then one branch is subjected to Reshape operator computation, and the other branch is subjected to Fully connected operator computation.

It is assumed that the tensor is firstly input into a Transpose operator, and the Transpose operator is a tensor operation without changing numerical values in an input tensor that is input into the Transpose operator. The Transpose operator plays a role in changing the axis layout order of an array. For example, concerning a two-axis array, the counterchange of orders of the two axes is just matrix transpose. The Transpose operator may be applied to cases of more axes. An input parameter of the Transpose operator is an axis layout order of an output array, counting from an order number 0. It is assumed that the input tensor of the Transpose operator is, for example, a two-axis matrix [[1, 2, 3], [4, 5, 6], [7, 8, 9], [10, 11, 12]] or represented as $$\begin{bmatrix} 1 & 2 & 3 \\ 4 & 5 & 6 \\ 7 & 8 & 9 \\ 10 & 11 & 12 \end{bmatrix},$$

for example, a two-axis matrix representing image data as 4*3. Transpose ([[1, 2, 3], [4, 5, 6], [7, 8, 9], [10, 11, 12]]) represents transposing, that is, changing the two-axis matrix into [[1, 4, 7, 10], [2, 5, 8, 11], [3, 6, 9, 12]], or a matrix of 3*4 represented as $$\begin{bmatrix} 1 & 4 & 7 & 10 \\ 2 & 5 & 8 & 11 \\ 3 & 6 & 9 & 12 \end{bmatrix}.$$

As may be seen, although the Transpose operator changes the axis layout order, that is, changes the shape of the tensor, it does not change the numerical values in the tensor, for example, the numerical values are still 1, 2, 3, 4, 5, 6, 7, 8, 9, 10, 11, 12. Of course, the Transpose operator may also change the layout order of the numerical values without changing the shape of the tensor (e.g., a 3*3 matrix is still a 3*3 matrix after transpose) or the numerical values in the tensor.

Then, the above-described tensor $$\begin{bmatrix} 1 & 4 & 7 & 10 \\ 2 & 5 & 8 & 11 \\ 3 & 6 & 9 & 12 \end{bmatrix}$$

having undergone the Transpose operator operation is divided into two branches. One branch is subjected to Reshape operator computation, while the other branch is subjected to Fully connected operator computation.

Specific operation of the Reshape operator is changing a shape property of the tensor, which may arrange a matrix a of m*n into a matrix b with a size of i*j. For example, the Reshape operator (Reshape (A, 2, 6), where, A is the input tensor) changes the shape of the above-described tensor $$\begin{bmatrix} 1 & 4 & 7 & 10 \\ 2 & 5 & 8 & 11 \\ 3 & 6 & 9 & 12 \end{bmatrix}$$

from 3*4 into 2*6. Therefore, the output tensor obtained through the Reshape operator is, for example, $$\begin{bmatrix} 1 & 3 & 5 & 7 & 9 & 11 \\ 2 & 4 & 6 & 8 & 10 & 12 \end{bmatrix}.$$

It may be seen that the Reshape operator also changes the shape of the tensor without changing the numerical values in the tensor, for example, the numerical values are still 1, 2, 3, 4, 5, 6, 7, 8, 9, 10, 11, 12.

The Fully connected operator (also referred to as a Full Connection operator) may be regarded as a special convolutional layer or as a product of tensors, in which the entire tensor input serves as a feature map for feature extraction operation. That is, one feature space is linearly transformed into another feature space, and an output tensor is a weighted sum of the input tensors. For example, the Fully connected operator has an input tensor (the output tensor of the Transpose operator)

$$\begin{bmatrix} 1 & 4 & 7 & 10 \\ 2 & 5 & 8 & 11 \\ 3 & 6 & 9 & 12 \end{bmatrix}$$

matrix multiplied by a weight matrix x with a size of 4*1, for example, $$\begin{matrix} 40 \\ 50 \\ 60 \\ 70 \end{matrix}.$$

So far, a specific operation process of a computational graph in a neural network applied to image data processing and recognition as shown in FIG. 1 has been introduced.

Based on the example in FIG. 1, it may be seen that although the Transpose operator changes the axis layout order, that is, changes the shape of the tensor, it does not change the numerical values in the tensor, for example, the numerical values are still 1, 2, 3, 4, 5, 6, 7, 8, 9, 10, 11, 12. Although there are two subsequent operators in the computational graph, namely, the Reshape operator and the Fully connected operator, yet numerical values in the tensor output by the Transpose operator to the Reshape operator and the Fully connected operator are the same as the numerical values in the input tensor of the Transpose operator. Therefore, it may be considered whether some changes may be made to operators such as the Transpose operator in the computational graph, to optimize the execution speed and execution time of these operators.

FIG. 2 shows a method for optimizing the computing power of a neural network module through a chip according to an implementation of the present disclosure.

As shown in FIG. 2, a method 200 for optimizing computing power of a neural network module through a chip includes: step 201: obtaining, by the chip, a computational graph of the neural network module having respective operators, wherein the neural network module receives application data to obtain a process output result of the application data; step 202: performing, by the chip, at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out; wherein the first operator is a tensor operation without changing numerical values in an input tensor; step 203: determining, by the chip, a second operator adjacent to the adjusted first operator in the computational graph according to the specific operations of each operator, wherein an operation of the adjusted first operator and an operation of the second operator are capable of being merged or canceled out without affecting an operation result; and step 204: performing merge or cancellation, by the chip, on the adjusted first operator and the second operator, and executing operations of respective operators in the computational graph after the merge or the cancellation.

Figures 3A, 3B:
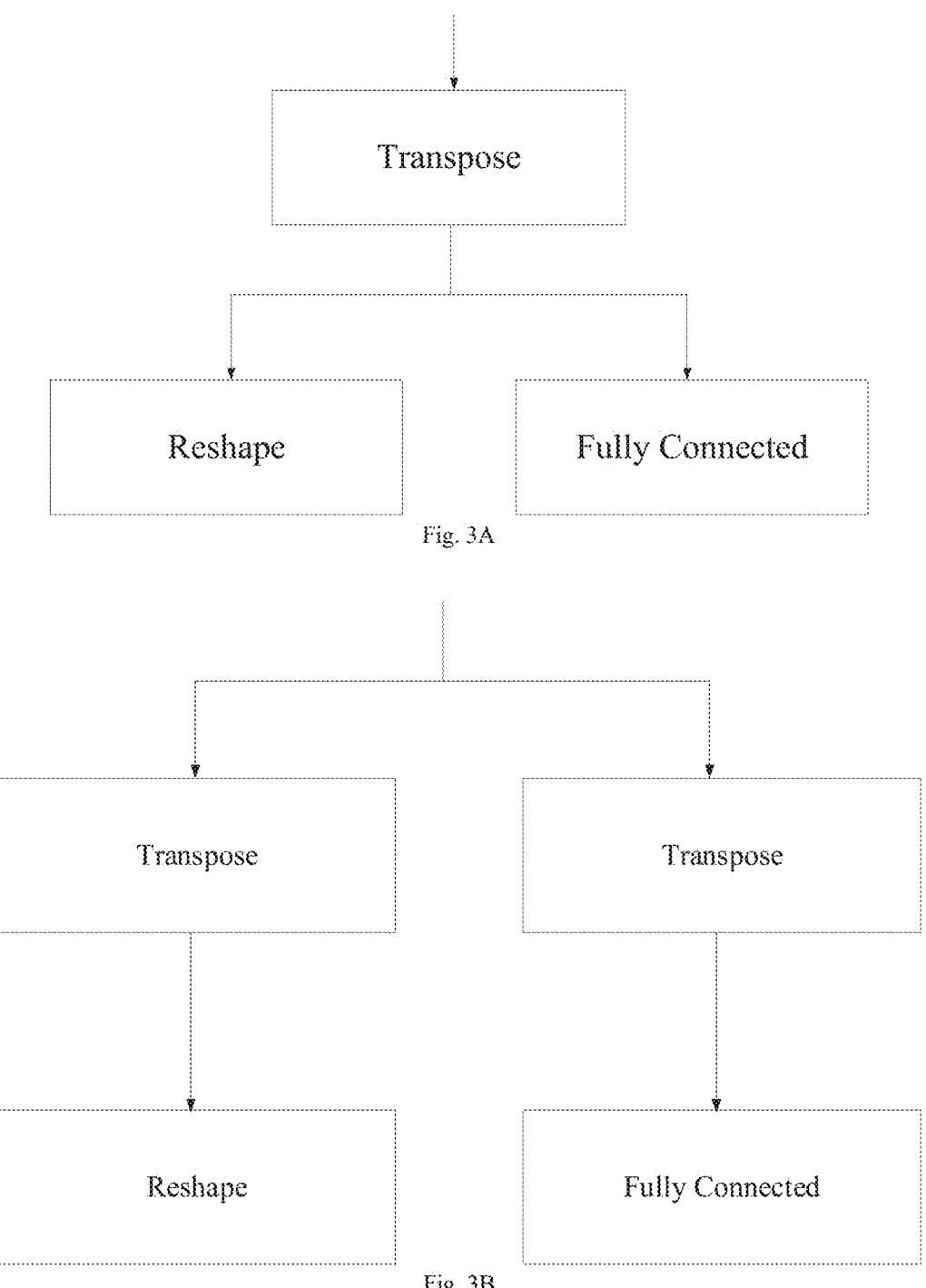
FIG. 3A shows a schematic diagram of an original computational graph including a plurality of operators according to the implementation of the present disclosure.
FIG. 3B shows a schematic diagram of splitting a first operator into two or more identical operators in a computational graph according to the implementation of the present disclosure.
Figures 3C, 4:
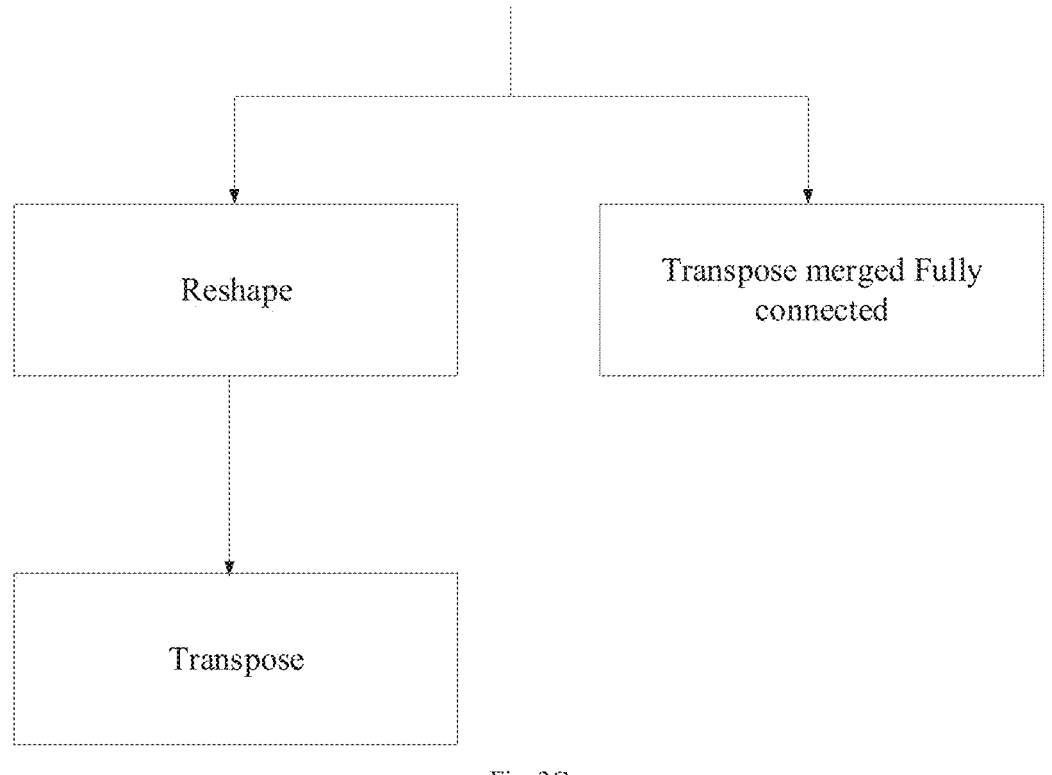
FIG. 3C shows a schematic diagram of an optimized computational graph after adjusting the first operator according to the implementation of the present disclosure.
FIG. 4 shows a schematic diagram of unifying two or more identical first operators into one operator and down-shifting the operator in the computational graph according to the implementation of the present disclosure.

Based on the example in FIG. 1, the specific process of the above-described method 200 will be illustrated in conjunction with FIG. 3A to 3C. FIG. 3A shows a schematic diagram of an original computational graph including a plurality of operators according to the implementation of the present disclosure. FIG. 3B shows a schematic diagram of splitting a first operator into two or more identical operators in a computational graph according to the implementation of the present disclosure. FIG. 3C shows a schematic diagram of an optimized computational graph after adjusting the first operator according to the implementation of the present disclosure.

Firstly, in step 201, obtaining, by the chip, the computational graph of the neural network module having respective operators, and the neural network module receiving application data to obtain the process output result of the application data. For example, the chip obtains a computational graph of a neural network module having respective operators, for example, a Transpose operator, a Reshape operator, and a Fully connected operator as shown in FIG. 3A. The neural network module receives image data to obtain a process output result of the image data.

In step 202, performing, by the chip, at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out. The first operator is a tensor operation without changing numerical values in an input tensor. For example, the tensor operation without changing the numerical values in the input tensor may be a tensor operation changing the shape or layout order of the tensor. As shown in FIG. 3A, the Transpose operator is determined as the first operator of the tensor operation without changing the numerical values in the input tensor.

In one embodiment, if the first operator has either two or more subsequent operators that are branched or two or more preceding operators that are branched (e.g., the first operator is followed by two or more subsequent operators, or the first operator has two or more preceding operators that are branched, or the first operator has one or more subsequent operator and one or more preceding operator), the first operator is split into two or more identical operators so that each first operator is in one-to-one correspondence with one subsequent operator or one preceding operator.

Because the Transpose operator is followed by two subsequent operators, namely, a Reshape operator and a Fully connected operator branched, as shown in FIG. 3B, the Transpose operator is split into two identical Transpose operators, so that each Transpose operator is in one-to-one correspondence with a subsequent operator, that is, one Transpose operator corresponds to a subsequent Reshape operator, and the other Transpose operator corresponds to a subsequent Fully connected operator. That is, originally, the input tensor is firstly subjected to one operation of the Transpose operator and then an output tensor of the Transpose operator is respectively subjected to an operation of the Reshape operator and an operation of the Fully connected operator to obtain two output tensors, which then continue to undergo operations of subsequent operators. After adjustment, the input tensor is only subjected to one operation of the Transpose operator and then is subjected to the operation of the Reshape operator, next, the input tensor is subjected to another operation of the Transpose operator and then is subjected to the operation of the Fully connected operator.

Of course, another adjustment may further be made at this time; for example, in FIG. 3C, a Transpose operator on a left branch may have a position counterchanged with a subsequent Reshape operator, so that the input tensor is firstly subjected to an operation of the Reshape operator, and then is subjected to an operation of Transpose operator. Here, because the operation of a Transpose operator is a tensor operation without changing numerical values in an input tensor, the operation of each operator after the Transpose operator is moved down will not change the final operation result. In this way, counterchange of the position of a Transpose operator with a subsequent Reshape operator allows for consideration of whether the Transpose operator after counterchanging the position (here, downshifted) may be merged or canceled out with a preceding operator or subsequent operator (here, a subsequent operator) of the Transpose operator after counterchanging the position.

In the examples shown in FIG. 3A to FIG. 3C, the split Transpose operator is moved down on the left branch; however, actually, the Transpose operator may be up-shifted or down-shifted on each branch, because one Transpose operator is split into Transpose operators according to the number of branches, and the number of the split Transpose operators is equal to the number of branches, so that the Transpose operator may be up-shifted or down-shifted on each branch to seek opportunities to be merged or canceled out with other operators.

In step 203, determining, by the chip, a second operator adjacent to the adjusted first operator in the computational graph according to the specific operations of each operator, and an operation of the adjusted first operator and an operation of the second operator being capable of being merged or canceled out without affecting an operation result.

It is assumed that the chip determines a Fully connected operator adjacent to the split Transpose operator in the computational graph according to specific operations of respective operators, and an operation of the split Transpose operator and an operation of the Fully connected operator may be merged or canceled out without affecting an operation result.

In one embodiment, if the operation of the second operator before the merge or the cancellation is a second operator operation performed on the numerical values in the output tensor of the adjusted first operator, merging the adjusted first operator and the second operator into a fourth operator after the merge or the cancellation. The operation of the fourth operator includes: reading, by the chip, the numerical values in the input tensor of the adjusted first operator in a predetermined order, to replace a tensor operation of the adjusted first operator per se, wherein the predetermined order is determined according to the tensor operation of the adjusted first operator per se; and performing the second operator operation on the numerical values read by the chip according to the operation of the second operator.

As shown in the right branch of FIG. 3C, the split Transpose operator and the subsequent Fully connected operator may be merged to form a Transpose merged Fully connected operator. That is, because the Transpose operator is actually transpose of a tensor, originally, the input tensor is firstly subjected to the Transpose operator and is transposed, and then the transposed tensor is subjected to an operation of the Fully connected operator; but after merging, the chip reads the respective numerical values in the input tensor in a transpose order and directly performs the operation of the Fully connected operator. This is because the Transpose operator transposes the input tensor without changing the respective numerical values in the tensor, but only changes the positions thereof in rows or columns.

It is assumed that the original Transpose operator has an input tensor, for example, $$\begin{bmatrix} 1 & 2 & 3 \\ 4 & 5 & 6 \\ 7 & 8 & 9 \\ 10 & 11 & 12 \end{bmatrix},$$

an output tensor $$\begin{bmatrix} 1 & 4 & 7 & 10 \\ 2 & 5 & 8 & 11 \\ 3 & 6 & 9 & 12 \end{bmatrix}.$$

The Fully connected operator has an input tensor (the output tensor of the Transpose operator)

$$\begin{bmatrix} 1 & 4 & 7 & 10 \\ 2 & 5 & 8 & 11 \\ 3 & 6 & 9 & 12 \end{bmatrix}$$

matrix multiplied by a weight matrix x with a size of 4*1, for example, $$\begin{matrix} 40 \\ 50 \\ 60 \\ 70 \end{matrix},$$

that is, respectively reads rows of the transposed matrix, with a first row multiplied by the weight matrix x, then a second row multiplied by the weight matrix x, and finally a third row multiplied by the weight matrix x. Specifically, 1 multiplied by 40 plus 4 multiplied by 50 plus 7 multiplied by 60 plus 10 multiplied by 70 serves as the first value of a result tensor of the Fully connected operator; 2 multiplied by 40 plus 5 multiplied by 50 plus 8 multiplied by 60 plus 11 multiplied by 70 serves as the second value of the result tensor of the Fully connected operator; and 3 multiplied by 40 plus 6 multiplied by 50 plus 9 multiplied by 60 plus 12 multiplied by 70 serves as the third value of the result tensor of the Fully connected operator.

Then the input tensor of the Transpose merged Fully connected operator is $$\begin{bmatrix} 1 & 2 & 3 \\ 4 & 5 & 6 \\ 7 & 8 & 9 \\ 10 & 11 & 12 \end{bmatrix},$$

that is, a matrix before transpose; while the Transpose merged Fully connected operator may directly read numerical values from a first column of the input tensor for matrix multiplication, then read a second column and then read a third column, that is also, 1 multiplied by 40 plus 4 multiplied by 50 plus 7 multiplied by 60 plus 10 multiplied by 70 serves as the first value of a result tensor of the Fully connected operator; 2 multiplied by 40 plus 5 multiplied by 50 plus 8 multiplied by 60 plus 11 multiplied by 70 serves as the second value of the result tensor of the Fully connected operator; and 3 multiplied by 40 plus 6 multiplied by 50 plus 9 multiplied by 60 plus 12 multiplied by 70 serves as the third value of the result tensor of the Fully connected operator.

An operation of selectively reading (changing from originally reading the first row, the second row, and the third row of the transposed matrix to reading the first column, the second column, and the third column of the matrix before the transposition) may be completed through a read operation by the chip. That is, the chip reads the numerical values in the input tensor of the Transpose merged Fully connected operator in a predetermined order, to replace the tensor operation of the split Transpose operator per se. In the example, a hardware operation of the chip reading the numerical values in the input tensor in the predetermined order of the first column, the second column and the third column may replace the transpose operation of the Transpose operator per se. The predetermined order is determined according to the tensor operation of the split Transpose operator per se, that is, if it is transpose here, the predetermined order should achieve an effect of transpose.

In one embodiment, the chip reading the numerical values in the input tensor of the adjusted first operator in the predetermined order may be implemented by setting at least one of stride, offset, and loop count for chip reading through software. In this way, the user may flexibly set at least one of stride, offset, and loop count for chip reading through software to change a read order, so as to replace tensor operations of some operators per se with a hardware read operation of the chip.

The hardware read operation of the chip may be specifically configured by some static random-access memory (SRAM) controllers through software to read/write at least one of stride, offset and loop count from the static random-access memory (SRAM). For example, with respect to an input tensor of a residual in SRAM $$\begin{bmatrix} 1 & 2 & 3 \\ 4 & 5 & 6 \\ 7 & 8 & 9 \\ 10 & 11 & 12 \end{bmatrix},$$

which is continuously stored as 1, 2, 3, 4, 5, 6, 7, 8, 9, 10, 11, 12 in SRAM, the SRAM controller configures stride, offset and loop count through software, for example, configures the stride as 3 (i.e., how many digits are stridden over from each read to a next read); configures the offset as 0, added by 1 after each loop (i.e., where to start a next loop of reading after each loop having been read), and configures the loop count as 3 (i.e., 3 read loops), so that the read order is no longer the original 1, 2, 3, 4, 5, 6, 7, 8, 9, 10, 11, 12, but changed into 1, 4, 7, 10, 2, 5, 8, 11, 3, 6, 9, 12. It should be noted that here, if the offset is a certain numerical value by default, and the loop count is a certain numerical value by default, then the software-configured parameter may only be the stride of read. Therefore, the SRAM controller may configure at least one of stride, offset and loop count of read through software, which will not be exemplified here. Then, the numerical values read by the chip sequentially undergo a matrix multiplication operation of the Fully connected operator, according to a subsequent operation of the Fully connected operator, to implement the operation of the Transpose merged Fully connected operator. Therefore, such merging does not change the final operation result but may eliminate the time required to compute the Transpose operator separately, thereby saving time.

In step 204, performing merge or cancellation, by the chip, on the adjusted first operator and the second operator, and executing operations of respective operators in the computational graph after the merge or the cancellation.

Here, after adjusting, merging, or canceling out the operators in the computational graph, the chip may perform the operations of the respective operators in the optimized overall computational graph.

In this way, these operators may be optimized according to specific operation rules of operators in the computational graph of the neural network for processing image data, to reduce the number of operators to be computed or reduce the computational complexity of operator operations, thereby shortening real-time running latency of the neural network for processing image data on the chip.

In one embodiment, if subsequent operators of two or more identical first operators are the same operator, then the two or more identical first operators are unified into one operator.

FIG. 4 shows a schematic diagram of unifying two or more identical first operators into one operator and down-shifting the operator in the computational graph according to the implementation of the present disclosure.

When subsequent operators of two or more identical first operators are the same operator, as shown in FIG. 4, subsequent operators of three Transpose operators are the same SomeOp operator (referring to a certain operator, which will not be limited here), that is, when a plurality of preceding operators of the SomeOp operator all are the same Transpose operator, the three preceding Transpose operators of the SomeOp operator may be unified into one Transpose operator. It should be noted that there may further be three preceding operators on each of the three branches of the three Transpose operators, as not shown in FIG. 4.

The unified Transpose operator may also be up-shifted (i.e., have a position counterchanged with a preceding operator) or down-shifted (i.e., have a position counterchanged with a subsequent operator) to seek opportunities to be merged or canceled out with other operators. In the example in FIG. 4, it is assumed that the SomeOp operator may move the Transpose operator down to a subsequent operator of the SomeOp operator (not shown) to be merged or canceled out with the subsequent operator to reduce redundant Transpose operator, or create possibilities for subsequent merge or counteract operations.

In the above example, the Transpose operator is moved down, but actually, the Transpose operator may also be moved up to seek opportunities for optimization, that is, whether it may be merged or canceled out with an adjacent operator to reduce computational complexity. For example, an up-shifted Transpose operator is found to be an inverse operation of another adjacent Transpose operator, so that the two may be canceled out.

In all the above examples, the Transpose operator is down-shifted 1 time, but the Transpose operator may also be up-shifted or down-shifted multiple times to seek opportunities for optimization, that is, whether it may be merged or canceled out with an adjacent operator to reduce computational complexity.

Figures 5, 6:
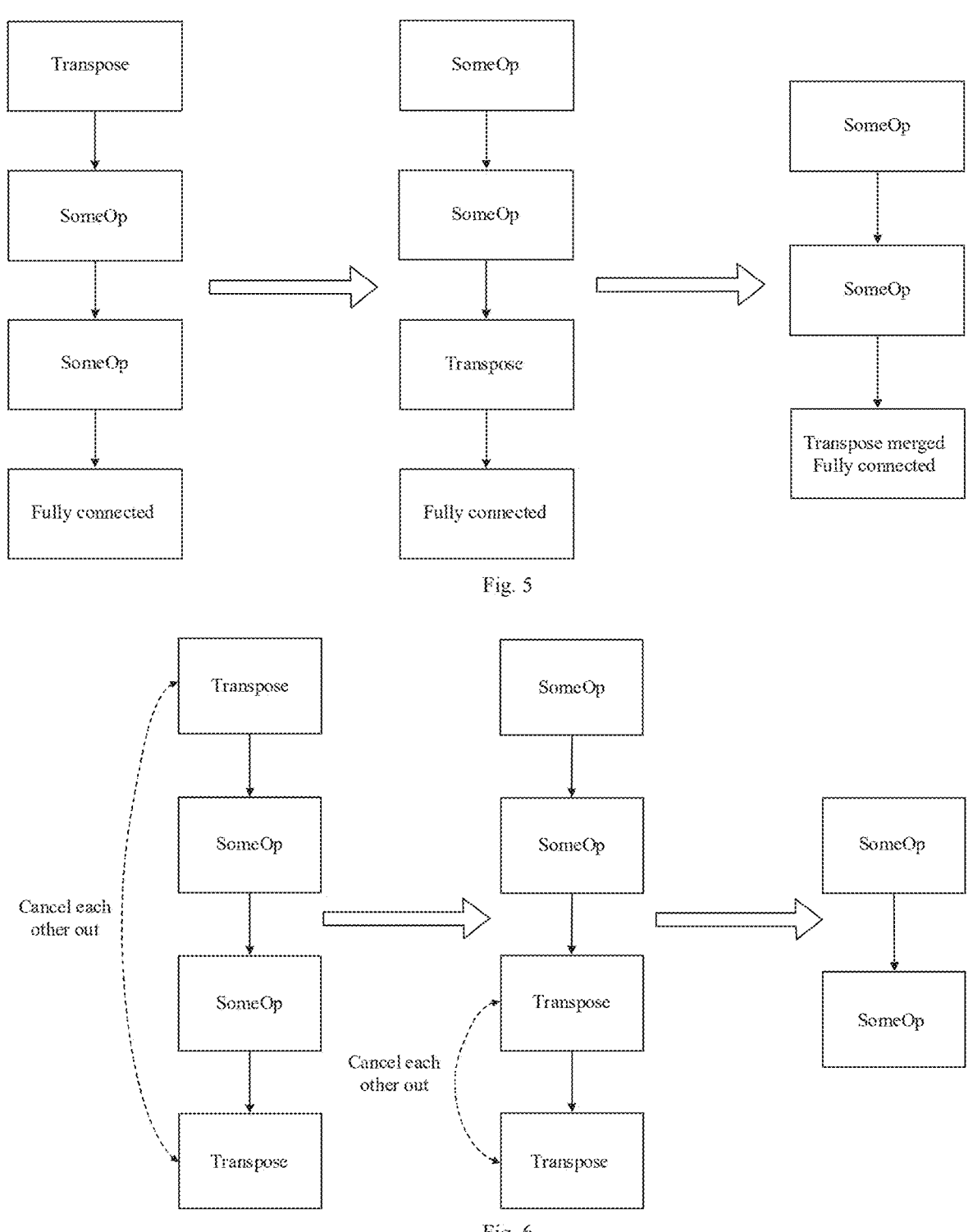
FIG. 5 shows a schematic diagram of continuously down-shifting a Transpose operator multiple times and merging the same with a Fully connected operator in the computational graph according to the implementation of the present disclosure.
FIG. 6 shows a schematic diagram of the cancellation of the first operator with a second operator in the computational graph according to the implementation of the present disclosure.

FIG. 5 shows a schematic diagram of continuously down-shifting a Transpose operator multiple times and merging the same with a Fully connected operator in the computational graph according to the implementation of the present disclosure.

As shown in FIG. 5, the Transpose operator is continuously down-shifted 2 times (i.e., has a position counterchanged with subsequent SomeOp operators 2 times) and then merged with a Fully connected operator. As illustrated above, such merge may also be implemented through a hardware read operation of the chip, for example, some static random-access memory (SRAM) controllers may configure at least one of stride, offset, and loop count for reading/writing from the static random-access memory (SRAM), to implement the same semantics as the Transpose operator, that is, achieve an effect of transpose. In this way, the Transpose operator continuously down-shifted 2 times may be merged with an adjacent subsequent Fully connected operator to form a Transpose merged Fully connected operator.

In addition to the Fully connected operator that may be merged with the Transpose operator, other operators that support merging with the Transpose operator to optimize may also be Reshape operator, broadcast operator, gather operator, reverse operator, concat operator, flatten operator, cast operator, elementwise binary operator, batch fully connected operator, convolution operator, and other Transpose operators incapable of canceling out but capable of being merged.

In one embodiment, if before the merge or the cancellation, the adjusted first operator and the second operator are mutually inverse operations, then the first operator and the second operator cancel each other out.

FIG. 6 shows a schematic diagram of the cancellation of the first operator with a second operator in the computational graph according to the implementation of the present disclosure.

As shown in FIG. 6, it is assumed that an upper Transpose operator and a lower Transpose operator in an original computational graph on the left are mutually inverse operations, for example, the upper Transpose operator is a 4*3 matrix transposed from a 3*4 matrix, and the lower Transpose operator is a 3*4 matrix transposed from a 4*3 matrix, then, the two Transpose operators are mutually inverse operations. In the original computational graph, the two Transpose operators are not adjacent to each other, so the two cannot be directly canceled out. Therefore, the upper Transpose operator is continuously moved down 2 times (has a position counterchanged with subsequent operators 2 times) to be adjacent to the lower Transpose operator, and then the two Transpose operators may be mutually canceled out and deleted.

In this way, the number of operators to be computed or the computational complexity of operator operations is reduced, thereby shortening the real-time running latency of the neural network for processing image data on the chip.

In one embodiment, if before the merge or the cancellation, the second operator is a tensor operation without changing the numerical values in the input tensor, then after the merge or the cancellation, the adjusted first operator and the second operator are merged into a third operator, and a tensor operation of the third operator implements both the tensor operation of the adjusted first operator and the tensor operation of the second operator.

That is to say, if the first operator is a tensor operation without changing numerical values in an input tensor, and the second operator adjacent thereto is also a tensor operation without changing numerical values in an input tensor, the two are neither identical operations, nor mutually inverse operations, but are different modes or types of tensor operations.

For example, the first operator may be at least one type of transpose operator, reshape operator, broadcast operator, gather operator, reverse operator, concat operator, and cast operator. The second operator may also be at least one type of transpose operator, reshape operator, broadcast operator, gather operator, reverse operator, concat operator, and cast operator. For example, the first operator is a Transpose operator, and the second operator is also a Transpose operator. But the two Transpose operators are neither exactly identical operations, nor mutually inverse operations.

Figures 7, 8A:
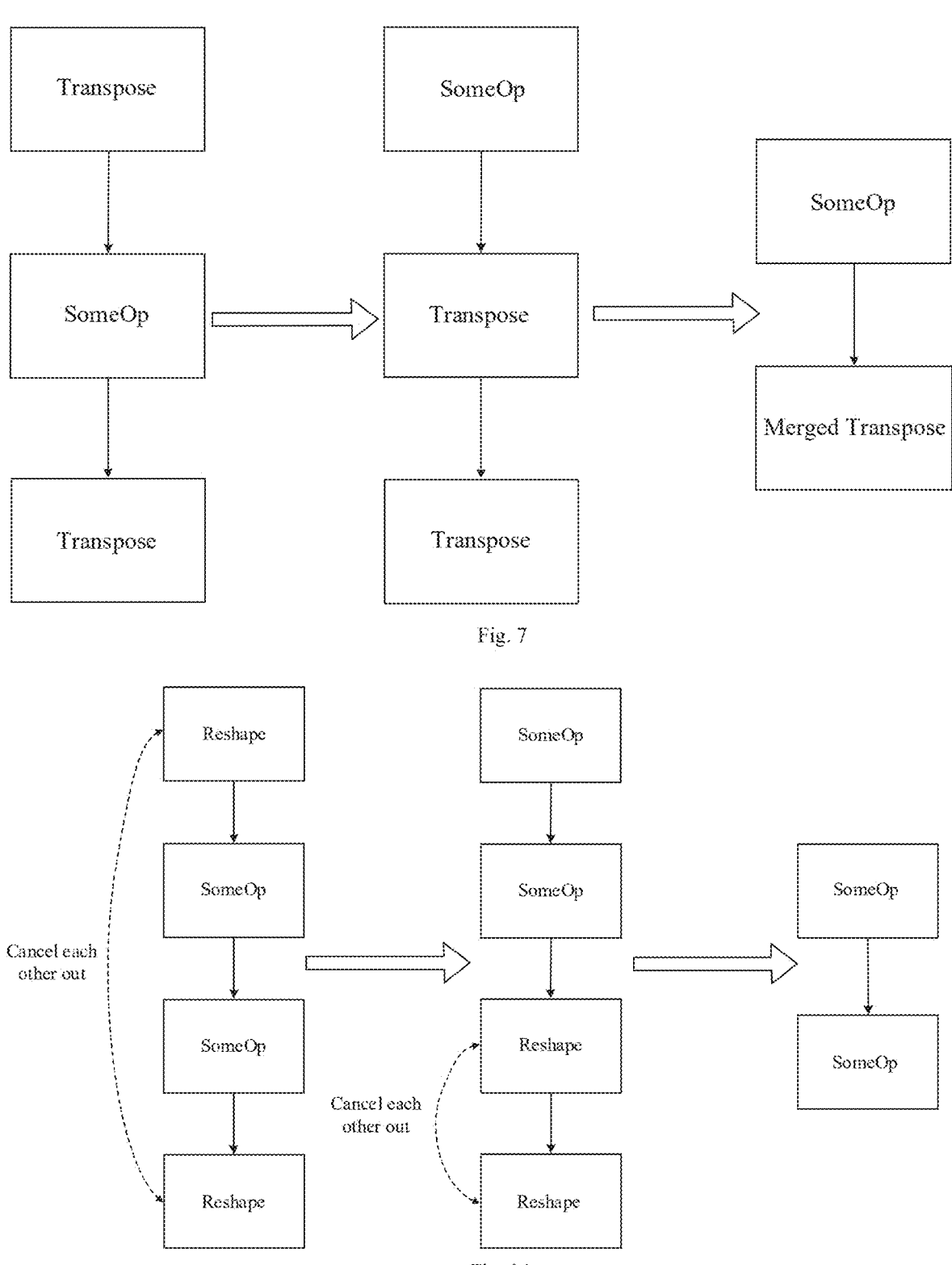
FIG. 7 shows a schematic diagram of down-shifting a Transpose operator and then merging the same with an adjacent Transpose operator into one Transpose operator in the computational graph according to the implementation of the present disclosure.
FIG. 8A shows a schematic diagram of the cancellation of a Reshape operator with another Reshape operator that are mutually inverse operations in the computational graph according to the implementation of the present disclosure.

FIG. 7 shows a schematic diagram of down-shifting one Transpose operator and then merging the same with an adjacent Transpose operator into one Transpose operator in the computational graph according to the implementation of the present disclosure.

As shown in FIG. 7, in the computational graph, firstly, a Transpose operator is moved down and then may be merged when finding an adjacent Transpose operator. Therefore, the down-shifted Transpose operator is merged with the adjacent Transpose operator to form one merged Transpose operator. Because operations of the Transpose operators are all about changing the shape of a tensor, the merged Transpose operator implements both the tensor operation of the down-shifted Transpose operator and the tensor operation of the Transpose operator adjacent thereto, that is, the Transpose operator is used just 1 time to change the shape of the tensor to a final result, instead of using the Transpose operator 2 times to perform 2 tensor operations to implement the final result.

The above example shows that the Transpose operator serves as the first operator capable of being merged, canceled out, etc. with other operators; and other operators serving as the first operator will be introduced below.

In one embodiment, the first operator may be a Reshape operator. The Reshape operator converts a tensor into a tensor of other shapes. It can be seen that an operation of the Reshape operator is a tensor operation without changing numerical values in an input tensor.

FIG. 8A shows a schematic diagram of the cancellation of a Reshape operator with another Reshape operator that are mutually inverse operations in the computational graph according to the implementation of the present disclosure.

As shown in FIG. 8A, it is assumed that an upper Reshape operator and a lower Reshape operator in the original computational graph on the left are mutually inverse operations, for example, an operation of the upper Reshape operator is changing a shape from a 3*4 matrix to a 2*6 matrix; and an operation of the lower Reshape operator is changing a shape from a 2*6 matrix to a 3*4 matrix. The two Reshape operators are mutually inverse operations. In the original computational graph, the two Reshape operators are not adjacent to each other, so the two cannot be directly canceled out. Therefore, the upper Reshape operator is continuously down-shifted 2 times (has a position counterchanged with a subsequent operator 2 times) to be adjacent to the lower Reshape operator; and then the two Reshape operators may be mutually canceled out and deleted.

In this way, the number of operators to be computed or the computational complexity of operator operations is reduced, thereby shortening the real-time running latency of the neural network for processing image data on the chip.

Figure 8B:
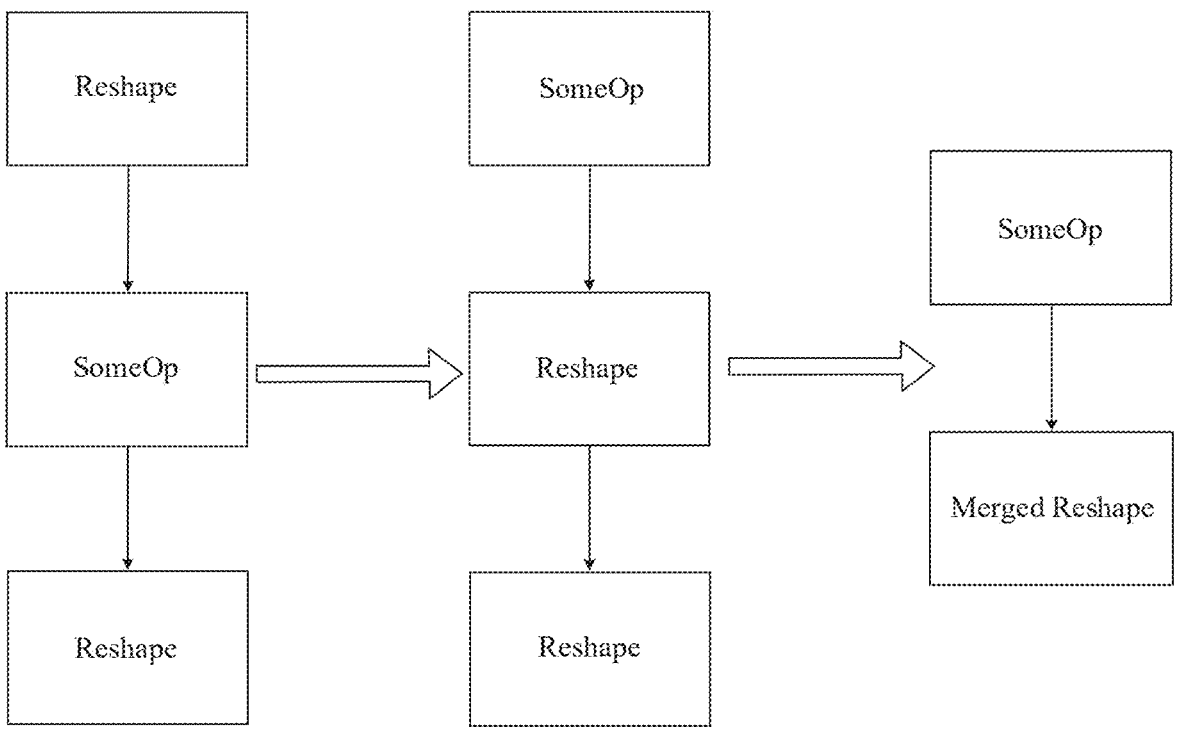
FIG. 8B shows a schematic diagram of down-shifting a Reshape operator and then merging the same with an adjacent Reshape operator into one Reshape operator in the computational graph according to the implementation of the present disclosure.

FIG. 8B shows a schematic diagram of down-shifting 1 Reshape operator and then merging the same with an adjacent Reshape operator into one Reshape operator in the computational graph according to the implementation of the present disclosure.

As shown in FIG. 8B, in the computational graph, firstly, 1 Reshape operator is down-shifted and may be merged when finding an adjacent Reshape operator. Therefore, the down-shifted Reshape operator is merged with an adjacent Reshape operator to form one merged Reshape operator. Because operations of the Reshape operators are all about changing the shape of a tensor, the merged Reshape operator implements both the tensor operation of the down-shifted Reshape operator and the tensor operation of the Reshape operator adjacent thereto, that is, the Reshape operator is used just 1 time to change the shape of the tensor to a final result, instead of using the Reshape operator 2 times to perform 2 tensor operations to implement the final result.

For example, if the operation of the upper Reshape operator is changing a shape from a 3*4 matrix to a 2*6 matrix, and the operation of the lower Reshape operator is changing a shape from a 2*6 matrix to a 6*2 matrix, then the operation of the merged Reshape operator may be changing a shape from a 3*4 matrix to a 6*2 matrix.

Of course, the above examples show several optimization modes of the Reshape operator, but are not limited to; actually, the Reshape operator may also be merged with other operators (the second operator). Since it is a tensor operation without changing numerical values in an input tensor, the chip may be used to read the numerical values in the input tensor of the adjusted Reshape operator in a predetermined order, to replace the tensor operation of the adjusted Reshape operator per se.

In one embodiment, the first operator may be a Broadcast operator. The Broadcast operator expands an input tensor to another tensor, for example, expands a tensor with a shape A to a tensor with a shape B, where A and B are tensor shapes represented by axes. It can be seen that the operation of the Broadcast operator is a tensor operation without changing numerical values in an input tensor.

Figure 9A:
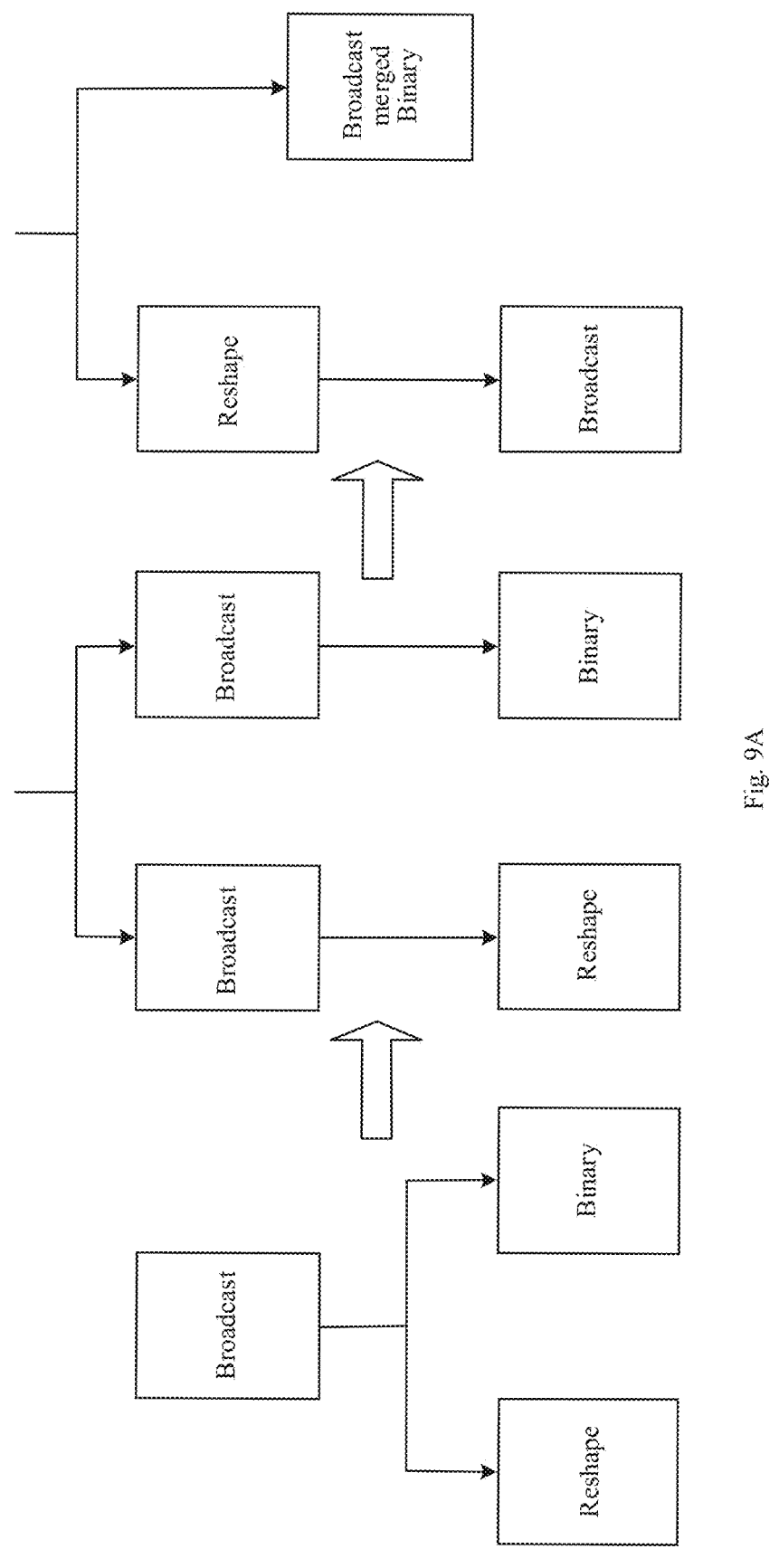
FIG. 9A shows a schematic diagram of splitting a Broadcast operator into two Broadcast operators to optimize the computational graph according to the implementation of the present disclosure.

FIG. 9A shows a schematic diagram of splitting a Broadcast operator into two Broadcast operators to optimize the computational graph according to the implementation of the present disclosure.

Since the Broadcast operator is followed by two subsequent operators, namely, a Reshape operator and a Binary operator, as shown in FIG. 9A, the Broadcast operator is split into two identical Broadcast operators, so that each Broadcast operator is in one-to-one correspondence with a subsequent operator, that is, one Broadcast operator corresponds to a subsequent Reshape operator, and the other Broadcast operator corresponds to a subsequent Binary operator. That is, originally, the input tensor is firstly subjected to an operation of the Broadcast operator 1 time, and then an output tensor of the Broadcast operator respectively undergoes an operation of the Reshape operator and an operation of the Binary operator, to obtain two output tensors, which then continue to undergo operations of subsequent operators. After adjustment, the input tensor is subjected to an operation of the Broadcast operator 1 time, and then is subjected to an operation of the Reshape operator; the input tensor is subjected to the Broadcast operator another time, and then is subjected to the operation of the Binary operator. The Binary operator, also referred to as an Elementwise Binary operator, binarizes numerical values in an input tensor.

Of course, another adjustment may further be made at this time; for example, in FIG. 9A, the Broadcast operator on the left branch may have a position counterchanged with a subsequent Reshape operator, so that the input tensor first undergoes the operation of the Reshape operator, and then undergoes the operation of the Broadcast operator. Here, since the operation of the Broadcast operator is a tensor operation without changing numerical values in an input tensor, the operations of the respective operators after moving the Broadcast operator down will not change the final operation result. In this way, the counterchange of a position of a Broadcast operator with a subsequent Reshape operator allows for consideration of whether the Broadcast operator having a position counterchanged (here, down-shifted) may be merged or canceled out with a further preceding operator or subsequent operator thereof (here, a subsequent operator).

As shown in the right branch of FIG. 9A, the split Broadcast operator and the subsequent Binary operator may be merged to form a Broadcast merged Binary operator. That is, the Broadcast operator is actually the expansion of a tensor, so originally, the input tensor first undergoes the Broadcast operator and expanded, and then the expanded tensor undergoes the operation of the Binary operator; after merging, the chip reads respective numerical values in the input tensor of the Broadcast operator in an order of the expanded tensor; for example, if a numerical value needs to be expanded (i.e., copied), the numerical value should be read more times, and the read numerical value directly undergoes the operation of the Binary operator. This is because the Broadcast operator expands the input tensor without changing the respective numerical values in the tensor, but only changes the number of times the numerical values appear in the tensor.

If the Broadcast operator changes [1,2,4] to [[1,1],[2,2], [4,4]], and the binary operator takes a value 1 when the numerical value is greater than 3, and takes a value 0 when the numerical value is less than 3, then the Broadcast merged Binary operator may be implemented through reading by the chip in a predetermined order. For example, the chip reads 2 times in a position storing 1, and performs a Binary operator operation after each read, to determine as 0,0; the chip reads 2 times in a position storing 2, and performs a Binary operator operation after each read, to determine as 0,0; the chip reads 2 times in a position storing 4, and performs a Binary operator operation after each read, to determine as 1,1; and finally, the output tensor of the Broadcast merged Binary operator is [[0,0],[0,0],[1,1]].

Figure 9B:
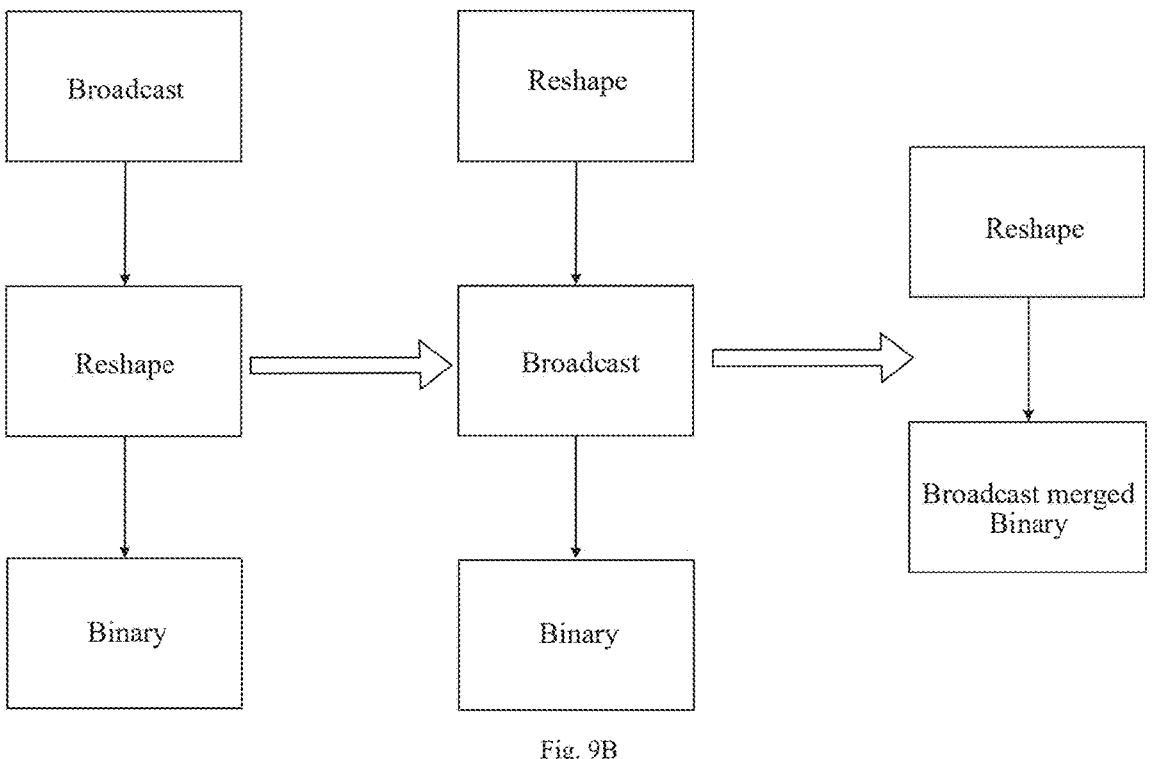
FIG. 9B shows a schematic diagram of down-shifting a Broadcast operator and merging the same with a Binary operator in the computational graph according to the implementation of the present disclosure.

FIG. 9B shows a schematic diagram of down-shifting a Broadcast operator and merging the same with a Binary operator in the computational graph according to the implementation of the present disclosure.

As shown in FIG. 9B, the Broadcast operator is moved down (i.e., has a position counterchanged with a subsequent Reshape operator) and then merged with the Binary operator. As illustrated above, such merge may also be implemented through a hardware read operation of the chip, for example, some static random access memory (SRAM) controllers may configure at least one of stride, offset, and loop count for reading/writing from the static random access memory (SRAM), so as to implement the same semantics as the Broadcast operator, that is, achieve an effect of expansion. In this way, the down-shifted Broadcast operator may be merged with an adjacent subsequent Binary operator to form a Broadcast merged Binary operator.

In addition to the Binary operator that may be merged with the Broadcast operator, other operators that support merging with the Broadcast operator to optimize may also be a batch fully connected operator (also referred to as a batch matmul operator), etc.

In one embodiment, the first operator may be a Gather operator. An operation of the Gather operator is selecting some numerical values from some numerical values in an input tensor as an output tensor. It can be seen that the operation of the Gather operator is a tensor operation without changing numerical values in an input tensor.

Figure 10:
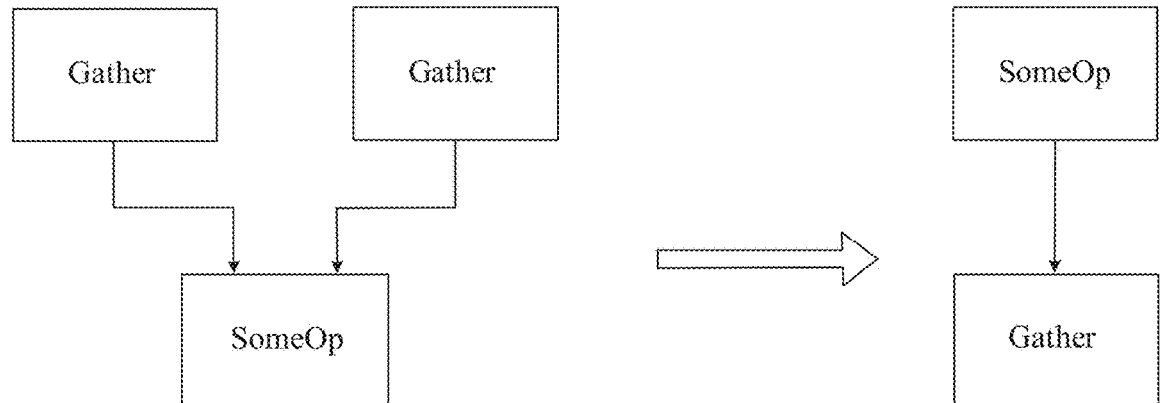
FIG. 10 shows a schematic diagram of unifying two Gather operators into one Gather operator and down-shifting the same according to the implementation of the present disclosure.

FIG. 10 shows a schematic diagram of unifying two Gather operators into one Gather operator and down-shifting the same according to the implementation of the present disclosure.

When subsequent operators of two or more identical first operators are the same operator, as shown in FIG. 10, the subsequent operators of two Gather operators are the same SomeOp operator, the two preceding Gather operators of the SomeOp operator may be unified into one Gather operator.

The unified Gather operator may continue to be moved down (i.e. have a position counterchanged with a subsequent operator) to seek opportunities to be merged or canceled out with other operators. In the example in FIG. 10, it is assumed that the SomeOp operator may allow the Gather operator to be down-shifted to a subsequent operator of the SomeOp operator (not shown) to be merged or canceled out with the subsequent operator to reduce the redundant Gather operator, or create possibilities for subsequent merge or counteract operations.

In one embodiment, the first operator may be a Reverse operator. The Reverse operator plays a role in reversing data sorting of a certain axis of the input tensor.

Figure 11:
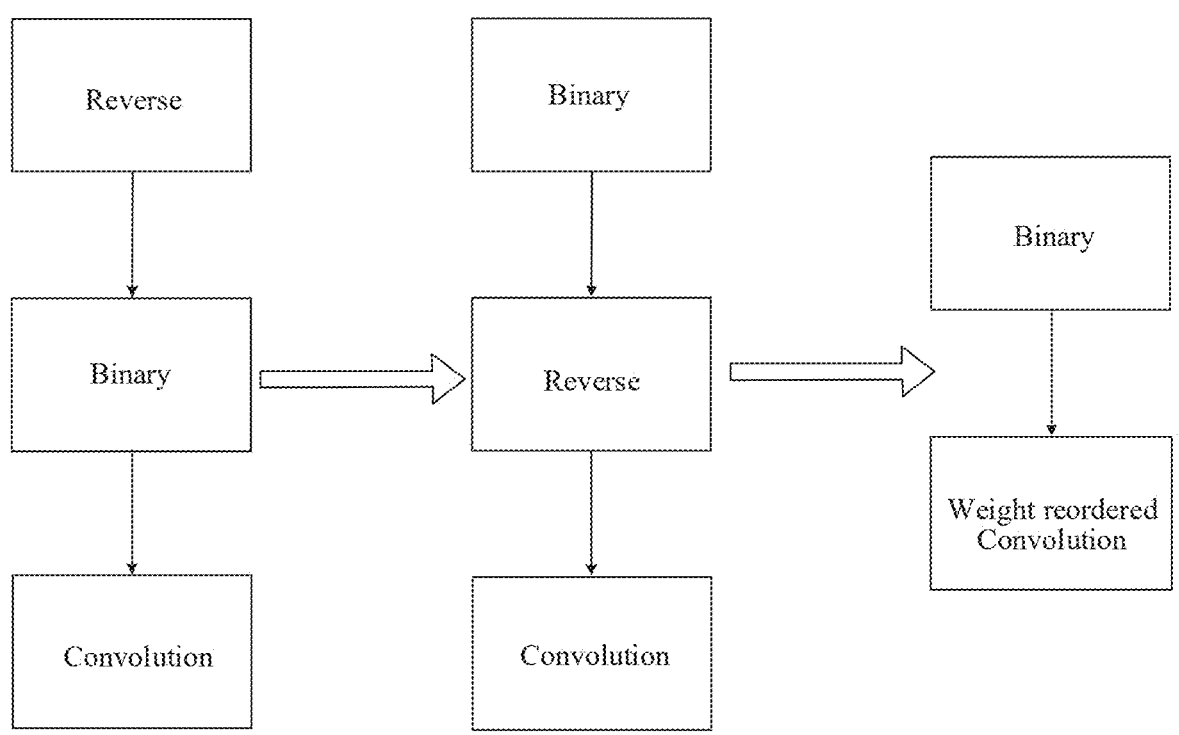
FIG. 11 shows a schematic diagram of down-shifting a Reverse operator and merging the same with a Convolution operator according to the implementation of the present disclosure.

FIG. 11 shows a schematic diagram of down-shifting a Reverse operator and merging the same with a Convolution operator according to the implementation of the present disclosure.

An operation of the Convolution operator is solving weight convolution. The Reverse operator may be merged with the Convolution operator, because an input tensor of the Convolution operator having undergone an operation of the Reverse operator in a certain direction only needs to change the layout of weights of the Convolution operator according to an operation rule of the Reverse operator, so as to conform to the same semantics as the original Convolution operator without changing an output. Therefore, the redundant Reverse operator may be optimized by down-shifting the Reverse operator and merging the same with the Convolution operator.

The embodiments of merging the Reshape operator and the Transpose operator with their own similar operators are described above, and other operators can be merged in the same category.

Figure 12A:
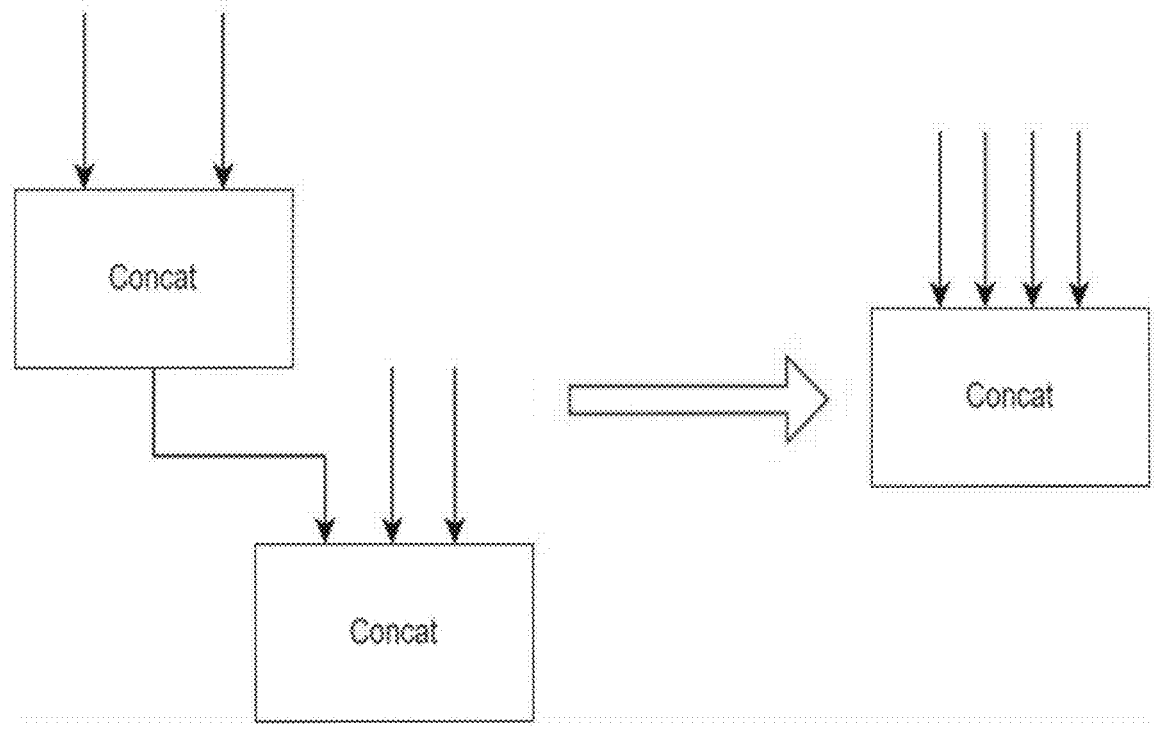
FIGS. 12A and 12B respectively show schematic diagrams of merging Concat operators and merging Cast operators according to the implementation of the present disclosure.
Figure 12B:
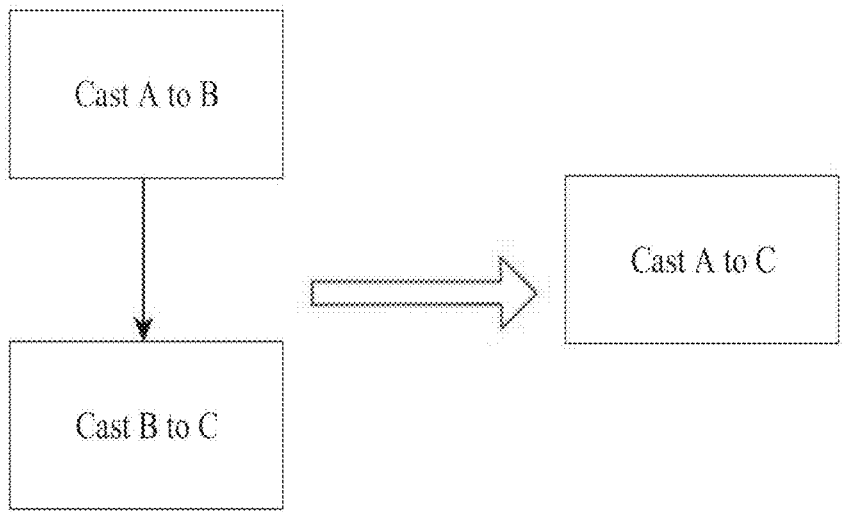

FIGS. 12A and 12B respectively show schematic diagrams of merging a Concat operator and a Cast operator according to the implementation of the present disclosure.

An operation of the Concat operator is concatenating two or more tensors, for example, concatenating a 3*4 tensor and a 3*6 tensor into a 3*10 tensor. It may be seen that the Concat operator is a tensor operation without changing numerical values in an input tensor.

As shown in FIG. 12A, one Concat operator may be merged with another adjacent Concat operator to form one Concat operator. For example, an operation of one Concat operator is concatenating a 3*4 tensor and a 3*6 tensor (2 input tensors, as shown by two downward input arrows above a left Concat operator in FIG. 12A) into a 3*10 tensor, while an operation of another Concat operator is concatenating the output tensor (3*10 tensor) of the left Concat operator with two other input tensors, for example, a 3*5 tensor and a 3*7 tensor (the other 2 input tensors, as shown by two downward input arrows on the top right of the middle Concat operator in FIG. 12A) into a 3*22 tensor. So an operation of a Concat operator after merging the two Concat operators may be inputting 4 tensors, namely, a 3*4 tensor and a 3*6 tensor, as well as a 3*5 tensor and a 3*7 tensors, and then concatenating the same into a 3*22 tensor all at once.

In this way, the number of operators to be computed or the computational complexity of operator operations is reduced, thereby shortening the real-time running latency of the neural network for processing image data on the chip.

An operation of a Cast operator is converting a type of numerical value, for example, converting an integer 1 to a floating-point number 1.0, or converting from a 32-bit integer to a 64-bit integer. It may be seen that the Cast operator only changes a type of numerical value, without changing the numerical value in an input tensor.

As shown in FIG. 12B, an upper left Cast A to B represents converting a tensor from type A to type B, while a lower left Cast B to C represents converting a tensor from type B to type C; so, an operation of a Cast operator after merging the two Cast operators may be Cast A to C, that is, directly converting a tensor from type A to type C.

In this way, the number of operators to be computed or the computational complexity of operator operations is reduced, thereby shortening the real-time running latency of the neural network for processing image data on the chip.

In one embodiment, in a process of adjusting the first operator, it may be considered to insert a plurality of first operators that cancel each other out, so that the plurality of first operators are capable of being merged or canceled out with other adjacent operators. Here, the first operators that cancel each other out may refer to being mutually inverse operations.

Figure 13A:
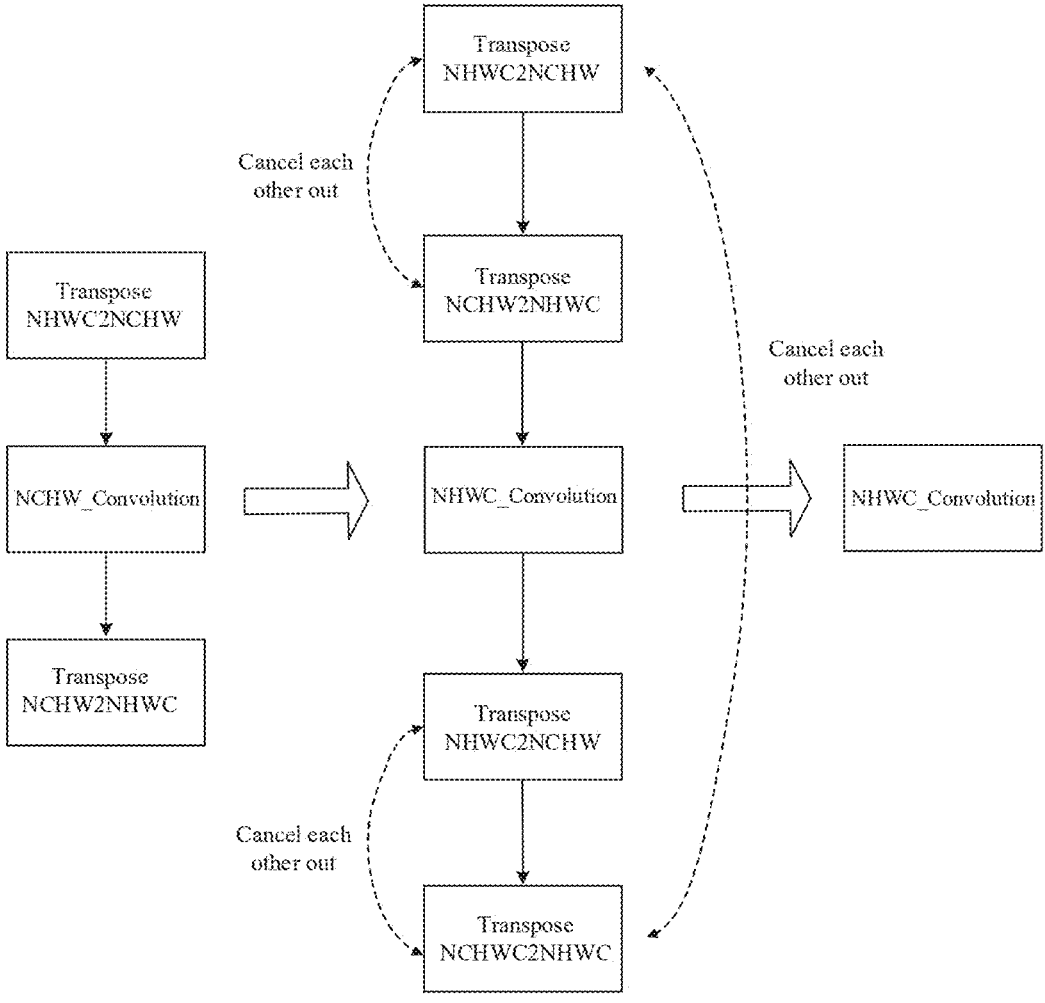
FIG. 13A shows a schematic diagram of one embodiment of inserting a plurality of first operators that cancel each other out, so that the plurality of first operators may be merged or canceled out with other adjacent operators according to the implementation of the present disclosure.

FIG. 13A shows a schematic diagram of one embodiment of inserting a plurality of first operators that cancel each other out, so that the plurality of first operators may be merged or canceled out with other adjacent operators according to the implementation of the present disclosure.

Firstly, image data channel formats have two types: NCHW layout, also referred to as: "channels_first"; and NHWC, also referred to as "channels_last". In the NCHW layout, C is in an outer layer, so within each channel, image pixels are arranged close together, that is, "RRRGGGBBB"; while in the NHWC layout, C is in the innermost layer, so within each channel, image pixels are spaced apart, that is, "RGBRGBRGB".

Formats of some neural network models natively support a Convolution operator with the NCHW layout; however, when operating on a chip with the NHWC layout, the NHWC layout needs to be converted to the NCHW layout in the computational graph, for performing NCHW convolution, and then converting a convolution result to the NHWC layout. Such a process, as embodied on the computational graph, for example, as shown on the left side of FIG. 13A, is: undergoing a Transpose NHWC2NCHW operator, then undergoing an NCHW_Convolution operator, and finally undergoing a Transpose NCHW2NHWC operator.

If a plurality of Transpose operators that cancel each other out are inserted on the original computational graph to convert such layout, then the entire computational graph may be optimized using down-shifting, merging, and/or canceling out, so that costs of converting the layout are minimized, and even eliminated in an optimal case where all inserted Transpose operators may be canceled out.

For example, as shown in FIG. 13A, in the first step, two Transpose operators that cancel each other out are inserted, namely, a Transpose NCHW2NHWC operator and a Transpose NHWC2NCHW operator (which are mutually inverse operations), respectively below the original Transpose NHWC2NCHW operator and above the Transpose NCHW2NHWC operator. In a second step, the inserted Transpose NCHW2NHWC operator and the Transpose NHWC2NCHW operator in the original computational graph cancel each other out because the two are mutually inverse operations, and the inserted Transpose NHWC2NCHW operator and the Transpose NCHW2NHWC operator in the original computational graph cancel each other out because the two are mutually inverse operations. Thus, the original computational graph may be optimized to only have the NHWC_Convolution operator left.

In this way, the number of operators to be computed or the computational complexity of operator operations is reduced, thereby shortening the real-time running latency of the neural network for processing image data on the chip.

Figure 13B:
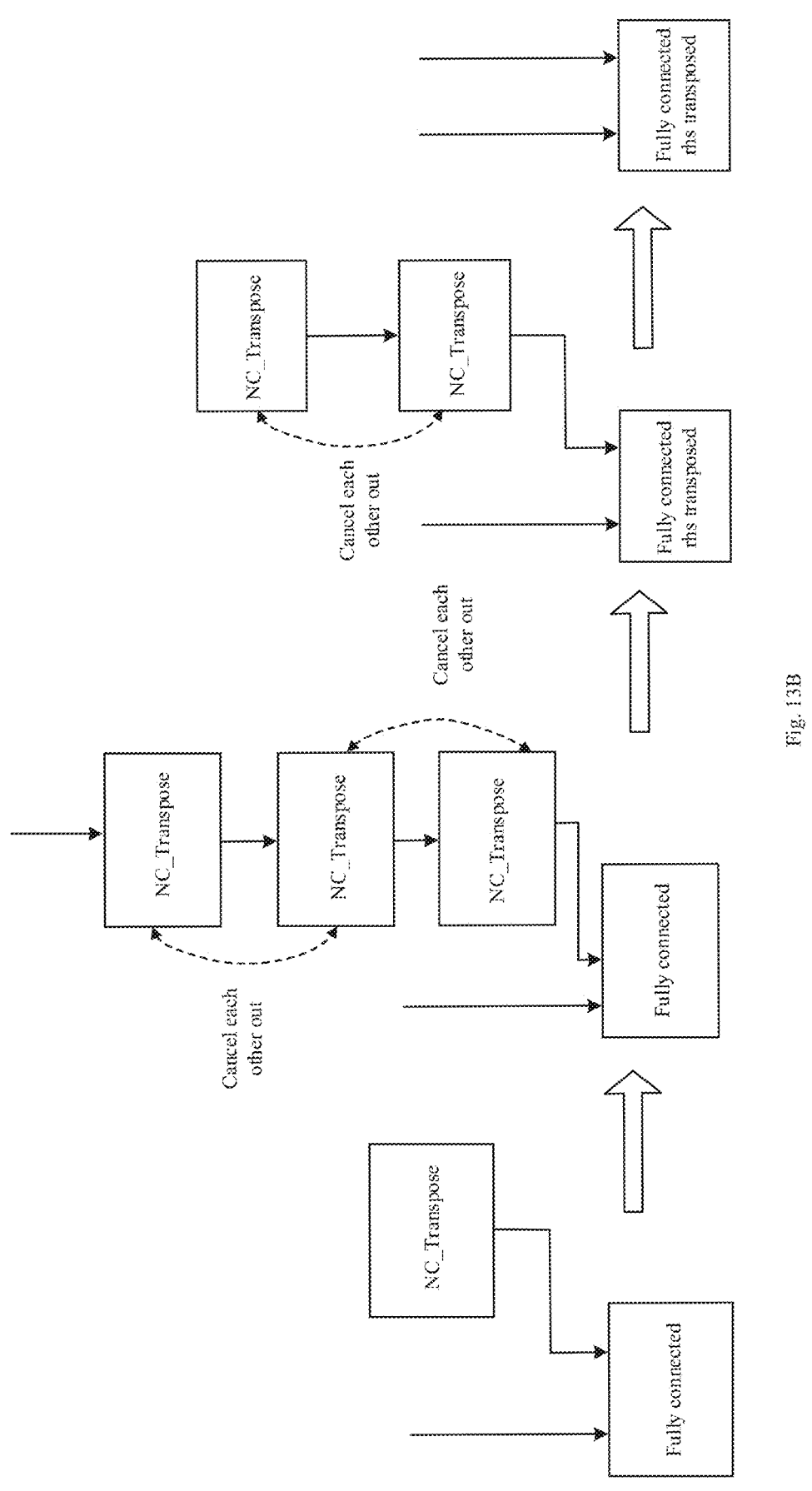
FIG. 13B shows a schematic diagram of another embodiment of inserting a plurality of first operators that cancel each other out, so that the plurality of first operators may be merged or canceled out with other adjacent operators according to the implementation of the present disclosure.

FIG. 13B shows a schematic diagram of another embodiment of inserting a plurality of first operators that cancel each other out, so that the plurality of first operators may be merged or canceled out with other adjacent operators according to the implementation of the present disclosure.

Firstly, when an operator of the neural network model has 2 inputs, the 2 inputs may be represented by a left-hand-side (LHS) input tensor and a right-hand-side (RHS) input tensor.

Formats of some neural network models natively support a Fully connected operator (i.e., matmul operator) whose RHS (the second input) does not carry Transpose; however, some chips require RHS of a Fully connected operator (i.e., matmul operator) to carry Transpose. When the two tensors undergo an operation of the Fully connected operator, attention needs to be paid to the problem of axis consistency; for example, a 3*4 tensor needs a 4*5 tensor to implement multiplication, that is, a column count 4 of a first tensor needs to be equal to a row count 4 of a second tensor to multiply and add numerical values thereof one by one, that is, to implement matrix multiplication. Therefore, there is an NC_Transpose operator in the original computational graph to convert an axis of one input tensor, to smoothly perform a subsequent operation of the Fully connected operator with another input tensor.

So, two Transpose operators that cancel each other out are inserted on the original computational graph to convert the layout, and then the entire computational graph is optimized by means of down-shifting, merging, and canceling, so that costs of converting the layout are minimized, and even eliminated in an optimal case where all inserted Transpose operators may be canceled out. A case similar to inserting the Transpose operators to convert RHS further includes inserting weights of Convolution, to convert weight layout from NCHW or HWCN to NHWC.

As shown in FIG. 13B, in the first step, two Transpose operators that are mutually inverse operations and can cancel each other out are inserted into the original computational graph on the left side of FIG. 13B, namely, an NC_Transpose operator (which is shown in shadow in the diagram and needs to be set as inverse to an original NC_Transpose operator) and an NC_Transpose operator inverse to the former, and are respectively inserted below the original NC_Transpose operator and above the Fully connected operator. In a second step, the NC_Transpose operator inserted above the Fully connected operator and the Fully connected operator in the original computational graph are merged to form a Fully connected operator carrying RHS Transpose (Fully connected rhs transposed as shown in FIG. 13B). In a third step, the inserted NC_Transpose operator (which is shown in shadow in the diagram) and the NC_Transpose operator in the original computational graph may be mutually counteracted because the two are mutually inverse operations. As a result, the original computational graph is optimized to only have a Fully connected operator carrying RHS Transpose.

In this way, the number of operators to be computed or the computational complexity of operator operations is reduced, thereby shortening the real-time running latency of the neural network for processing image data on the chip.

The above introduces a (adjusted) first operator is merged with an adjacent second operator, but the merged operator may be further optimized by moving up or down and merging or canceling with other adjacent operators, that is, continuous merging and possible cancellation can be performed.

In this way, some operators, due to specific operational content thereof, may be inserted into the computational graph or may be up-shifted or down-shifted so as to be merged or canceled out with operations of other operators, so that these operators are optimized, to reduce the number of operators to be computed or reduce the computational complexity of operator operations, thereby shortening real-time running latency of the neural network for processing image data on the chip. In addition, certain specific hardware reading functions of the artificial intelligence chip developed by the applicant may be combined, to ensure a computation result is consistent with the computation result of these operators before optimization while reducing the number of operators to be computed or reducing the computational complexity of operator operations. Such optimization is performed based on such a high level of semantic expression as a computational graph, avoiding some complex and tedious optimization work at an instruction level, and making optimizable scenarios more universal.

In summary, the respective implementations of the present disclosure may achieve at least effects below:

1. The Transpose operator on the computational graph is split and then down-shifted, merged, or canceled out for joint optimization, which changes the scheduling order of the Transpose operator, ultimately transforms the layout of the computational graph, reduces the computational complexity of redundant operators, and optimizes runtime latency of the computational graph.

2. The Reshape operator on the computational graph is down-shifted, merged, or canceled out for joint optimization, which changes a scheduling order of the Reshape operator, ultimately reduces redundant computation of redundant Reshape operators of the computational graph, and optimizes runtime latency of the computational graph.

3. The Broadcast operator may broadcast and expand the shape of a tensor; the Broadcast operator on the computational graph is split and then down-shifted and merged for joint optimization, which may reduce the computational complexity of Broadcast subsequent operators on the original computational graph, and ultimately optimize runtime latency of the computational graph.

4. The Gather operator usually selects a portion of data in an input as an output, so the data volume output by the Gather operator is usually smaller than the input data volume. However, on some chips, when a difference between the input data volume and the output data volume is less than a certain threshold, the cost of calculating the gather operator 2 times and having a subsequent node of the gather operator compute a small volume of data is much greater than a cost of having the subsequent node compute a slightly larger volume of data, but only calculating the gather operator 1 time. Therefore, the technology of merging two identical gather operators and down-shifting the same achieves an optimization effect.

5. By changing the weight layout of a Convolution operator, preceding Reverse operators of an input of the Convolution operator may be merged. Based on the char-acteristic, redundant Reverse operators may be optimized by down-shift and merge operations, to reduce computational complexity.

6. Operators capable of being continuously merged according to mathematical semantics may be selectively merged on a specific chip according to chip parameters, so as to reduce redundant operators and thus reduce computational complexity.

7. According to different specific scenarios and on different chips, the down-shift, merge, and cancellation operations in the optimization technology may be executed in variable orders and combined flexibly, to achieve an optimization effect while meeting requirements of keeping mathematical semantics unchanged.

8. The above-described process is simulated with a 1-GHz simulator. In the absence of the above-described optimization operations, the inference latency of 4pe 4batch is 4562102 ns. After the optimization operations, the inference latency is 4450052 ns. That is to say, under the model, the latency optimization percentage of the chip simulator running the neural network in real-time reaches 2.46%, with an absolute value of 112.05 us.

Figure 14:
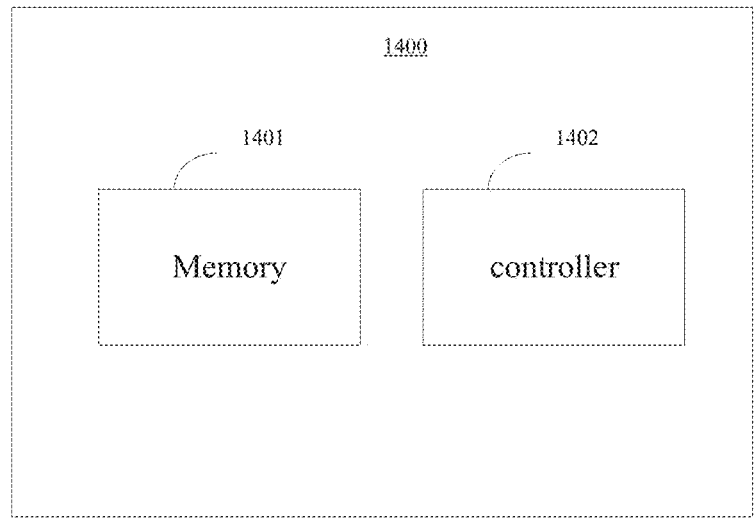
FIG. 14 shows a schematic block diagram of an artificial intelligence chip according to an implementation of the present disclosure.

FIG. 14 shows a schematic block diagram of an artificial intelligence chip according to an implementation of the present disclosure.

As shown in FIG. 14, the artificial intelligence chip 1400 includes: a memory 1401, configured to store received application data to be input into a computational graph of a neural network module having respective operators to obtain a process output result of the application data; a controller 1402, configured to: perform at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out; wherein the first operator is a tensor operation without changing numerical values in an input tensor; determine a second operator adjacent to the adjusted first operator in the computational graph according to specific operations of respective operators, wherein an operation of the adjusted first operator and an operation of the second operator are capable of being merged or canceled out without affecting an operation result; and perform merge or cancellation, by the chip, on the adjusted first operator and the second operator, and execute operations of respective operators in the computational graph after the merge or the cancellation.

In one embodiment, the application data includes at least one type of image data and natural language data.

In one embodiment, the performing, by the chip, at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out, includes: in response to the first operator having two or more subsequent operators and preceding operators that are branched, splitting the first operator into more than two identical operators so that each first operator is in one-to-one correspondence with a subsequent operator or a preceding operator; and in response to subsequent operators of two or more identical first operators being a same operator, unifying the two or more identical first operators into one operator.

In one embodiment, the performing merge or cancellation, by the chip, on the adjusted first operator and the second operator, and executing operations of respective operators in the computational graph after the merge or the cancellation, includes: merging the adjusted first operator and the second operator into a fourth operator after the merge or the cancellation, in response to the operation of the second operator before the merge or the cancellation being a second operator operation performed on numerical values in an output tensor of the adjusted first operator, wherein an operation of the fourth operator includes: reading, by the chip, the numerical values in the input tensor of the adjusted first operator in a predetermined order, to replace a tensor operation of the adjusted first operator per se, wherein the predetermined order is determined according to the tensor operation of the adjusted first operator per se; and performing the second operator operation on the numerical values read by the chip according to the operation of the second operator.

In one embodiment, the reading, by the chip, the numerical values in the input tensor of the adjusted first operator in a predetermined order is implemented by setting at least one of stride, offset and loop count for chip reading through software.

In one embodiment, the performing merge or cancellation, by the chip, on the adjusted first operator and the second operator, and executing operations of respective operators in the computational graph after the merge or the cancellation, includes: in response to the second operator being a tensor operation without changing numerical values in an input tensor before the merge or the cancellation, merging the adjusted first operator and the second operator into a third operator after the merge or the cancellation, wherein a tensor operation of the third operator implements both a tensor operation of the adjusted first operator and a tensor operation of the second operator.

In one embodiment, the performing merge or cancellation, by the chip, on the adjusted first operator and the second operator, and executing operations of respective operators in the computational graph after the merge or the cancellation, includes: in response to the adjusted first operator and the second operator before the merge or the cancellation being mutually inverse operations, canceling out the first operator and the second operator.

In one embodiment, the first operator is at least one selected from the group consisting of: transpose operator, reshape operator, broadcast operator, gather operator, reverse operator, concat operator, and cast operator.

In one embodiment, the second operator is at least one selected from the group consisting of: transpose operator, reshape operator, broadcast operator, gather operator, reverse operator, concat operator, flatten operator, cast operator, elementwise binary operator, batch fully connected operator and convolution operator.

In this way, some operators, due to specific operational content thereof, may be inserted into the computational graph or may be up-shifted or down-shifted so as to be merged or canceled out with operations of other operators, so that these operators are optimized, to reduce the number of operators to be computed or reduce the computational complexity of operator operations, thereby shortening real-time running latency of the neural network for processing image data on the chip. In addition, certain specific hardware reading functions of the artificial intelligence chip developed by the applicant may be combined, to ensure a computation result is consistent with a computation result of these operators before optimization while reducing the number of operators to be computed or reducing computational complexity of operator operations. Such optimization is performed based on such a high level of semantic expression as a computational graph, avoiding some complex and tedious optimization work in an instruction level, and making optimizable scenarios more universal.

Figure 15:
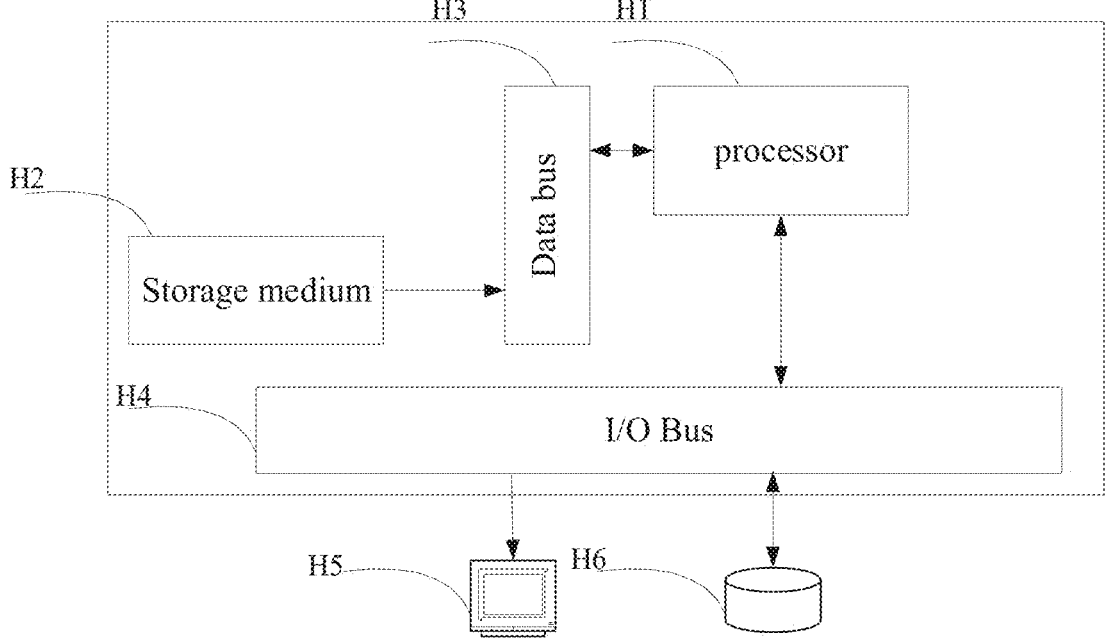
FIG. 15 shows a block diagram of an exemplary electronic device suitable for implementing an implementation of the present disclosure according to an implementation of the present disclosure.

FIG. 15 shows a block diagram of an exemplary electronic device suitable for implementing an implementation of the present disclosure according to an implementation of the present disclosure.

The electronic device may include a processor (H1); a storage medium (H2), coupled to the processor (H1) and having computer-executable instructions stored therein for performing steps of respective methods according to the embodiments of the present disclosure when executed by the processor.

The processor (H1) may include but is not limited to, for example, one or more processors or microprocessors.

The storage medium (H2) may include but is not limited to, for example, random-access memory (RAM), read-only memory (ROM), flash memory, EPROM memory, an EEPROM memory, a register, a computer storage medium (e.g., a hard drive, a floppy disk, a solid-state drive, a removable disk, a CD-ROM, a DVD-ROM, a blue disc, etc.).

In addition, the electronic device may further include a data bus (H3), an input/output (I/O) bus (H4), a display (H5), and an input/output device (H6) (e.g., a keyboard, a mouse, a speaker, etc.).

The processor (H1) may communicate with external devices (H5, H6, etc.) via a wired or wireless network (not shown) through the I/O bus (H4).

The storage medium (H2) may further have at least one computer-executable instruction stored thereon, for executing the steps of the respective functions and/or methods according to the embodiments as described in the art when executed by the processor (H1).

In one embodiment, at least one computer-executable instruction may also be compiled into or constitute a software product, wherein, one or more computer-executable instructions, when run by the processor, execute the steps of the respective functions and/or methods according to the embodiments as described in the art.

Figure 16:
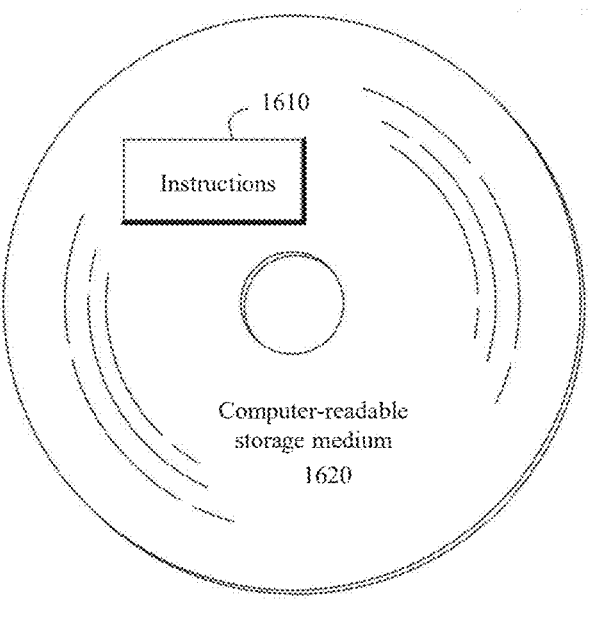
FIG. 16 shows a schematic diagram of a non-transitory computer-readable storage medium according to an implementation of the present disclosure.

FIG. 16 shows a schematic diagram of a non-temporary computer-readable storage medium according to an implementation of the present disclosure.

As shown in FIG. 16, the computer-readable storage medium 1620 has instructions stored thereon; and the instructions are, for example, computer-readable instructions 1610. The computer-readable instruction 1610, when run by a processor, may execute the respective methods as described above. The computer-readable storage medium includes but is not limited to, for example, a volatile memory and/or a non-volatile memory. The volatile memory may include, for example, a random access memory (RAM) and/or a cache, or the like. The non-volatile memory may include, for example, a read-only memory (ROM), a hard disk, a flash memory, or the like. For example, the computer-readable storage medium 1620 may be coupled to a computing device such as a computer; next, in a case where the computing device runs the computer-readable instruction 1610 stored on the computer-readable storage medium 1620, the above-described respective methods may be executed.

The present disclosure may include items as follows:

Item 1. A method for optimizing the computing power of a neural network module through a chip, including:

obtaining, by the chip, a computational graph of the neural network module having respective operators, wherein the neural network module receives application data to obtain a process output result of the application data;

performing, by the chip, at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out; wherein the first operator is a tensor operation without changing numerical values in an input tensor;

determining, by the chip, a second operator adjacent to the adjusted first operator in the computational graph according to the specific operations of each operator, wherein an operation of the adjusted first operator and an operation of the second operator are capable of being merged or canceled out without affecting an operation result; and performing merge or cancellation, by the chip, on the adjusted first operator and the second operator, and executing operations of respective operators in the computational graph after the merge or the cancellation.

Item 2. The method according to item 1, wherein the application data comprises at least one type of image data and natural language data.

Item 3. The method according to item 1, wherein the performing, by the chip, at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out, includes:

in response to the first operator having two or more subsequent operators and preceding operators that are branched, splitting the first operator into more than two identical operators so that each first operator is in one-to-one correspondence with a subsequent operator or a preceding operator; and in response to subsequent operators of two or more identical first operators being a same operator, unifying the two or more identical first operators into one operator.

Item 4. The method according to item 1, wherein the performing merge or cancellation, by the chip, on the adjusted first operator and the second operator, and executing operations of respective operators in the computational graph after the merge or the cancellation, includes:

merging the adjusted first operator and the second operator into a fourth operator after the merge or the cancellation, in response to the operation of the second operator before the merge or the cancellation being a second operator operation performed on numerical values in an output tensor of the adjusted first operator, wherein an operation of the fourth operator includes: reading, by the chip, the numerical values in the input tensor of the adjusted first operator in a predetermined order, to replace a tensor operation of the adjusted first operator per se, wherein the predetermined order is determined according to the tensor operation of the adjusted first operator per se; and performing the second operator operation on the numerical values read by the chip according to the operation of the second operator.

Item 5. The method according to item 4, wherein, the reading, by the chip, the numerical values in the input tensor of the adjusted first operator in the predetermined order is implemented by setting at least one of stride, offset and loop count for chip reading through software.

Item 6. The method according to item 1, wherein the performing merge or cancellation, by the chip, on the adjusted first operator and the second operator, and executing operations of respective operators in the computational graph after the merge or the cancellation, includes:

in response to the second operator being a tensor operation without changing numerical values in an input tensor before the merge or the cancellation, merging the adjusted first operator and the second operator into a third operator after the merge or the cancellation, wherein a tensor operation of the third operator implements both a tensor operation of the adjusted first operator and a tensor operation of the second operator.

Item 7. The method according to item 1, wherein the performing merge or cancellation, by the chip, on the adjusted first operator and the second operator, and executing operations of respective operators in the computational graph after the merge or the cancellation, includes:

in response to the adjusted first operator and the second operator before the merge or the cancellation being mutually inverse operations, canceling out the first operator and the second operator.

Item 8. The method according to item 1, wherein the first operator is at least one selected from the group consisting of: transpose operator, reshape operator, broadcast operator, gather operator, reverse operator, concat operator, and cast operator.

Item 9. The method according to item 1, wherein the second operator is at least one selected from the group consisting of: transpose operator, reshape operator, broadcast operator, gather operator, reverse operator, concat operator, flatten operator, cast operator, elementwise binary operator, batch fully connected operator and convolution operator.

Item 10. An artificial intelligence chip, including:

a memory, configured to store received application data to be input into a computational graph of a neural network module having respective operators to obtain a process output result of the application data;

a controller, configured to:

perform at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out; wherein the first operator is a tensor operation without changing numerical values in an input tensor;

determine a second operator adjacent to the adjusted first operator in the computational graph according to specific operations of respective operators, wherein an operation of the adjusted first operator and an operation of the second operator are capable of being merged or canceled out without affecting an operation result; and perform merge or cancellation, by the chip, on the adjusted first operator and the second operator, and execute operations of respective operators in the computational graph after the merge or the cancellation.

Item 11. The chip according to item 10, wherein, the application data comprises at least one type of image data and natural language data.

Item 12. The chip according to item 10, wherein the performing, by the chip, at least one of adjustments below at least 1 time on a first operator in the computational graph according to specific operation of each operator: counterchanging a position of the first operator with a subsequent operator or a preceding operator in the computational graph, splitting the first operator into more than two identical operators, and inserting a plurality of first operators that are capable of canceling each other out, includes:

in response to the first operator having two or more subsequent operators and preceding operators that are branched, splitting the first operator into more than two identical operators so that each first operator is in one-to-one correspondence with a subsequent operator or a preceding operator; and in response to subsequent operators of two or more identical first operators being a same operator, unifying the two or more identical first operators into one operator.

Item 13. The chip according to item 10, wherein the performing merge or cancellation, by the chip, on the adjusted first operator and the second operator, and executing operations of respective operators in the computational graph after the merge or the cancellation, includes:

merging the adjusted first operator and the second operator into a fourth operator after the merge or the cancellation, in response to the operation of the second operator before the merge or the cancellation being a second operator operation performed on numerical values in an output tensor of the adjusted first operator, wherein an operation of the fourth operator comprises: reading, by the chip, the numerical values in the input tensor of the adjusted first operator in a predetermined order, to replace a tensor operation of the adjusted first operator per se, wherein the predetermined order is determined according to the tensor operation of the adjusted first operator per se; and performing the second operator operation on the numerical values read by the chip according to the operation of the second operator.

Item 14. The chip according to item 13, wherein, the reading, by the chip, the numerical values in the input tensor of the adjusted first operator in a predetermined order is implemented by setting at least one of stride, offset and loop count for chip reading through software.

Item 15. The chip according to item 10, wherein the performing merge or cancellation, by the chip, on the adjusted first operator and the second operator, and executing operations of respective operators in the computational graph after the merge or the cancellation, comprises:

in response to the second operator being a tensor operation without changing numerical values in an input tensor before the merge or the cancellation, merging the adjusted first operator and the second operator into a third operator after the merge or the cancellation, wherein a tensor operation of the third operator implements both a tensor operation of the adjusted first operator and a tensor operation of the second operator.

Item 16. The chip according to item 10, wherein the performing merge or cancellation, by the chip, on the adjusted first operator and the second operator, and executing operations of respective operators in the computational graph after the merge or the cancellation, includes:

in response to the adjusted first operator and the second operator before the merge or the cancellation being mutually inverse operations, canceling out the first operator and the second operator.

Item 17. The chip according to item 10, wherein the first operator is at least one selected from the group consisting of: transpose operator, reshape operator, broadcast operator, gather operator, reverse operator, concat operator, and cast operator.

Item 18. The chip according to item 10, wherein the second operator is at least one selected from the group consisting of: transpose operator, reshape operator, broadcast operator, gather operator, reverse operator, concat operator, flatten operator, cast operator, elementwise binary operator, batch fully connected operator and convolution operator.

Item 19. An electronic device for optimizing computing power of a neural network module through a chip, including:

a memory, configured to store instructions;

a processor, configured to read instructions in the memory and execute the method according to any one of items 1 to 9.

Item 20. A non-temporary storage medium, having instructions stored thereon;

wherein, the instructions, when read by a processor, cause the processor to execute the method according to any one of items 1 to 9.

Of course, the above specific embodiments are only examples, not limitations, and those skilled in the art can combine and combine some steps and devices from the above separately described embodiments according to the concept of this application to achieve the effects of this application. Such combined and combined embodiments are also included in this application, and such combination and combination are not described here.

Note that the advantages, advantages, effects, etc. mentioned in this disclosure are only examples rather than limitations, and these advantages, advantages, effects, etc. cannot be considered as necessary for each embodiment of this application. In addition, the specific details disclosed above are only for the purpose of illustration and easy understanding, but not limitation, and the above details do not limit that this application must be implemented with the above specific details.

The block diagrams of devices, devices, equipment and systems involved in this disclosure are only illustrative examples and are not intended to require or imply that they must be connected, arranged and configured in the manner shown in the block diagram. As those skilled in the art will recognize, these devices, devices, devices and systems can be connected, arranged and configured in any way. Words such as "including", "containing", "having" and so on are open words, which mean "including but not limited to" and can be used interchangeably with them. The terms "or" and "and" as used herein refer to the terms "and/or" and can be used interchangeably with them unless the context clearly indicates otherwise. The word "such as" as used herein refers to the phrase "such as but not limited to" and can be used interchangeably with it.

The flowchart of steps in this disclosure and the above method description are only illustrative examples and are not intended to require or imply that the steps of various embodiments must be performed in the given order. As those skilled in the art will recognize, the sequence of steps in the above embodiments can be performed in any order. Words such as "thereafter", "then", "next" and so on are not intended to limit the order of steps; These words are only used to guide readers through the descriptions of these methods. Furthermore, any reference to an element in the singular, such as using the articles "a", "an" or "the", is not to be construed as limiting the element to the singular.

In addition, the steps and devices in various embodiments herein are not limited to a certain embodiment. In fact, some related steps and devices in various embodiments herein can be combined to conceive new embodiments according to the concept of this application, and these new embodiments are also included in the scope of this application.

The respective operations of the methods described above may be carried out through any appropriate means that may perform the corresponding functions. The means may include various hardware and/or software components and/or modules, including but not limited to hardware circuits, application-specific integrated circuits (ASICs), or processors.

A general-purpose processor, a digital signal processor (DSP), an ASIC, a field programmable gate array (FPGA) signal or other programmable logic device (PLD), a discrete gate or transistor logic, a discrete hardware component, or any combination thereof that is designed to perform the functions described herein may be utilized to implement or perform the respective logic blocks, modules, and circuits described. The general-purpose processor may be a microprocessor, but as a replacement, the processor may be any commercially available processor, controller, microcontroller, or state machine. The processor may also be implemented as a combination of computing devices, for example, a combination of a DSP and a microprocessor, a plurality of microprocessors, a microprocessor that collaborates with DSP cores, or any other such configuration.

The steps in conjunction with the methods or algorithms described in the present disclosure may be directly embedded in hardware, software modules executed by the processor, or a combination of the two. Software modules may exist in any form of tangible storage medium. Some examples of the storage medium that may be used include random access memory (RAM), read-only memory (ROM), flash memory, EPROM memory, EEPROM memory, a register, a hard drive, a removable disk, a CD-ROM, etc. The storage medium may be coupled to the processor so that the processor may read information from the storage medium and write information to the storage medium. In a replacement mode, the storage medium may be integrated with the processor. The software module may be a single instruction or a plurality of instructions and may be distributed across several different code segments, between different programs, and across a plurality of storage media.

The methods disclosed herein include actions for implementing the described methods. Methods and/or actions may be interchangeable with each other without departing from the scope of the claims. In other words, unless a specific order of actions is specified, the order and/or use of specific actions may be modified without departing from the scope of the claims.

The above-described functions may be implemented by hardware, software, firmware, or any combination thereof. If implemented by software, functions may be stored as instructions on a tangible computer-readable medium. The storage medium may be any available tangible medium that may be accessed by a computer. By example rather than limitation, such computer-readable medium may include a RAM, a ROM, an EEPROM, a CD-ROM or other optical storage, magnetic storage or other magnetic storage device, or any other tangible medium that may be used for carrying or storing desired program code in a form of instruction or data structure and may be accessed by a computer. As used here, a disk and a disc include a compact disc (CD), a laser disc, an optical disc, a digital versatile disc (DVD), a floppy disk, and a blue disc, wherein, the disk usually magnetically reproduces data, while the disc optically reproduces data with laser.

Therefore, a computer program product may perform the operations given here. For example, such a computer program product may be a computer-readable tangible medium having instructions tangibly stored (and/or encoded) thereon; and the instructions may be executed by a processor to perform the operations described herein. The computer program product may include a packaging material.

Software or instructions may also be transmitted through a transmission medium. For example, software may be transmitted from websites, servers, or other remote sources by using a transmission medium such as a coaxial cable, a fiber optic cable, a twisted pair cable, a digital subscriber line (DSL), or wireless technologies such as infrared, radio, or microwave.

In addition, modules and/or other appropriate means for carrying out the methods and techniques described herein may be downloaded and/or otherwise obtained by user terminals and/or base stations as appropriate. For example, such a device may be coupled to a server to facilitate the transmission of the means for performing the methods described herein. Or, the respective methods described here may be supplied by a storage component (e.g., a RAM, a ROM, a physical storage medium such as a CD or a floppy disk, etc.) so that the user terminal and/or the base station may obtain various methods when being coupled to the device or providing the storage component to the device. In addition, any other appropriate techniques for providing the methods and techniques described herein to the device may be utilized.

Other examples and implementations are within the scope and spirit of this disclosure and the appended claims. For example, due to the nature of software, the functions described above can be realized using software executed by a processor, hardware, firmware, hard wiring, or any combination of these. Features that implement functions can also be physically located at various locations, including being distributed so that parts of functions are implemented at different physical locations. Moreover, as used herein, including in the claims, the "or" used in the enumeration of items starting with "at least one" indicates a separate enumeration, so that, for example, the enumeration of "at least one of A, B or C" means A or B or C, or AB or AC or BC, or ABC (that is, A and B and C). Furthermore, the word "exemplary" does not mean that the described example is preferred or better than other examples.

Various changes, substitutions and modifications to the techniques described herein may be made without departing from the taught techniques defined by the appended claims. Furthermore, the scope of the claims of the present disclosure is not limited to the specific aspects of the above-described processes, machines, manufacturing, composition of events, means, methods and actions. Existing or later-to-be-developed processes, machines, manufactures, compositions, means, methods or actions that perform substantially the same functions or achieve substantially the same results as the corresponding aspects described herein can be utilized. Accordingly, the appended claims include such processes, machines, manufacture, compositions of events, means, methods or acts within their scope.

The above description of the disclosed aspects is provided to enable any person skilled in the art to make or use this application. Various modifications to these aspects will be obvious to those skilled in the art, and the general principles defined herein can be applied to other aspects without departing from the scope of this application. Therefore, this application is not intended to be limited to the aspects shown herein but is to be accorded the widest scope consistent with the principles and novel features disclosed herein.

The foregoing description has been presented for purposes of illustration and description. Furthermore, this description is not intended to limit the embodiments of this application to the forms disclosed herein. Although several example aspects and embodiments have been discussed above, those skilled in the art will recognize certain variations, modifications, changes, additions and sub-combinations thereof.

The invention claimed is:

1. A method for optimizing computing power of a neural network and reducing real-time running latency of the neural network for image processing and image recognition on a chip, wherein the chip comprises a controller and a memory configured to store image data, wherein the method comprises:

obtaining, by the chip, a computational graph of the neural network having a plurality of operators, wherein each operator among the plurality of operators corresponds to a specific tensor operation executable by the chip;

inputting tensors carrying numerical values of image pixels into the computational graph of the neural network, wherein the numerical values of image pixels are stored in the memory of the chip;

determining, by the chip, a first operator among the plurality of operators, wherein the first operator corresponds to a tensor operation that changes a layout order of numerical values contained in an input tensor but does not change the numerical values themselves in the input tensor;

performing, by the chip based on the specific tensor operation of each operator, at least one adjustment on the first operator, wherein the at least one adjustment on the first operator is performed for merging or cancelling out with other operators in the computational graph to optimize the computational graph, and wherein performing the at least one adjustment on the first operator comprises:

counterchanging a position of the first operator with a subsequent operator or a preceding operator in the computational graph, splitting the first operator into more than two identical operators, and inserting operators on the computational graph, wherein the inserted operators correspond to mutually inverse tensor operations, and each of the inserted operators changes a layout order of numerical values contained in a corresponding tensor but does not change the numerical values themselves in the corresponding tensor;

determining, by the chip based on the specific tensor operation of each operator, a second operator in the computational graph, wherein the second operator is adjacent to the adjusted first operator or the inserted operators, wherein an operation of the adjusted first operator or one of the inserted operators and an operation of the second operator are capable of being merged or canceled out without affecting an operation result;

implementing a merge on the adjusted first operator or the one of the inserted operators and the second operator through a hardware read operation of the chip, wherein the hardware read operation of the chip is configured by the controller of the chip to replace execution of the adjusted first operator or the one of the inserted operators; and generating an output result of the image recognition by executing tensor operations on the image data after implementing the merge of operators in the computational graph to optimize the computing power of the neural network and reduce the real-time running latency of the neural network.

2. The method according to claim 1, wherein the performing, by the chip, the at least one adjustment on a first operator in the computational graph comprises:

in response to the first operator having two or more subsequent operators and preceding operators that are branched, splitting the first operator into more than two identical first operators so that each first operator is in one-to-one correspondence with a subsequent operator or a preceding operator; and in response to subsequent operators of two or more identical first operators being a same operator, unifying the two or more identical first operators into one operator.

3. The method according to claim 1, wherein the performing, by the chip, the merge on the adjusted first operator and the second operator, and executing operations of respective operators in the computational graph after the merge, comprises:

merging the adjusted first operator and the second operator into a fourth operator after the merge, in response to the operation of the second operator before the merge being a second operator operation performed on numerical values in an output tensor of the adjusted first operator, wherein an operation of the fourth operator comprises:

reading, by the chip, the numerical values in the input tensor of the adjusted first operator in a predetermined order, to replace a tensor operation of the adjusted first operator with a reading operation, wherein the predetermined order is determined according to the tensor operation of the adjusted first operator; and performing the second operator operation on the numerical values read by the chip according to the operation of the second operator.

4. The method according to claim 1, wherein the performing, by the chip, the merge on the adjusted first operator and the second operator, and executing operations of respective operators in the computational graph after the merge, comprises:

in response to the second operator being a tensor operation without changing numerical values in an input tensor before the merge or the cancellation, merging the adjusted first operator and the second operator into a third operator after the merge or the cancellation, wherein a tensor operation of the third operator implements both a tensor operation of the adjusted first operator and a tensor operation of the second operator.

5. The method according to claim 1, wherein the performing, by the chip, the merge on the adjusted first operator and the second operator, and executing operations of respective operators in the computational graph after the merge, comprises:

in response to the adjusted first operator and the second operator before the merge being mutually inverse operations, canceling out the adjusted first operator and the second operator.

6. The method according to claim 1, wherein the first operator is at least one selected from the group consisting of: transpose operator, reshape operator, broadcast operator, gather operator, reverse operator, concat operator, and cast operator.

7. The method according to claim 1, wherein the second operator is at least one selected from the group consisting of: transpose operator, reshape operator, broadcast operator, gather operator, reverse operator, concat operator, flatten operator, cast operator, elementwise binary operator, batch fully connected operator and convolution operator.

8. An artificial intelligence chip, comprising:

a memory, configured to store received application data to be input into a computational graph of a neural network having a plurality of operators wherein each operator among the plurality of operators corresponds to a specific tensor operation executable by the artificial intelligence chip;

a controller, configured for:

inputting tensors carrying numerical values of image pixels into the computational graph of the neural network, wherein the numerical values of image pixels are stored in the memory of the artificial intelligence chip;

determining, by the artificial intelligence chip, a first operator among the plurality of operators, wherein the first operator corresponds to a tensor operation that changes a layout order of numerical values contained in an input tensor but does not change the numerical values themselves in the input tensor;

performing, by the artificial intelligence chip based on the specific tensor operation of each operator, at least one adjustment on the first operator, wherein the at least one adjustment on the first operator is performed for merging or cancelling out with other operators in the computational graph to optimize the computational graph, and wherein performing the at least one adjustment on the first operator comprises:

counterchanging a position of the first operator with a subsequent operator or a preceding operator in the computational graph, splitting the first operator into more than two identical operators, and inserting operators on the computational graph, wherein the inserted operators correspond to mutually inverse tensor operations, and each of the inserted operators changes a layout order of numerical values contained in a corresponding tensor but does not change the numerical values themselves in the corresponding tensor;

determining, by the by the artificial intelligence chip based on the specific tensor operation of each operator, a second operator in the computational graph, wherein the second operator is adjacent to the adjusted first operator or the inserted operators, wherein an operation of the adjusted first operator or one of the inserted operators and an operation of the second operator are capable of being merged or canceled out without affecting an operation result;

implementing a merge on the adjusted first operator or the one of the inserted operators and the second operator through a hardware read operation of the by the artificial intelligence chip, wherein the hardware read operation of the by the artificial intelligence chip is configured by the controller of the artificial intelligence chip to replace execution of the adjusted first operator or the one of the inserted operators; and generating an output result of the image recognition by executing tensor operations on the image data after implementing the merge of operators in the computational graph to optimize the computing power of the neural network and reduce the real-time running latency of the neural network.

9. The artificial intelligence chip according to claim 8, wherein the performing, by the artificial intelligence chip, the at least one adjustment on a first operator in the computational graph comprises:

in response to the first operator having two or more subsequent operators and preceding operators that are branched, splitting the first operator into more than two identical first operators so that each first operator is in one-to-one correspondence with a subsequent operator or a preceding operator; and in response to subsequent operators of two or more identical first operators being a same operator, unifying the two or more identical first operators into one operator.

10. The artificial intelligence chip according to claim 8, wherein the performing, by the artificial intelligence chip, the merge on the adjusted first operator and the second operator, and executing operations of respective operators in the computational graph after the merge, comprises:

merging the adjusted first operator and the second operator into a fourth operator after the merge, in response to the operation of the second operator before the merge being a second operator operation performed on numerical values in an output tensor of the adjusted first operator, wherein an operation of the fourth operator comprises:

reading, by the artificial intelligence chip, the numerical values in the input tensor of the adjusted first operator in a predetermined order, to replace a tensor operation of the adjusted first operator with a reading operation, wherein the predetermined order is determined according to the tensor operation of the adjusted first operator; and performing the second operator operation on the numerical values read by the artificial intelligence chip according to the operation of the second operator.

11. The artificial intelligence chip according to claim 8, wherein the performing, by the artificial intelligence chip, the merge on the adjusted first operator and the second operator, and executing operations of respective operators in the computational graph after the merge, comprises:

in response to the second operator being a tensor operation without changing numerical values in an input tensor before the merge, merging the adjusted first operator and the second operator into a third operator after the merge, wherein a tensor operation of the third operator implements both a tensor operation of the adjusted first operator and a tensor operation of the second operator.

12. The artificial intelligence chip according to claim 8, wherein the performing, by the artificial intelligence chip, the merge on the adjusted first operator and the second operator, and executing operations of respective operators in the computational graph after the merge, comprises:

in response to the adjusted first operator and the second operator before the merge being mutually inverse operations, canceling out the adjusted first operator and the second operator.

13. The artificial intelligence chip according to claim 8, wherein the first operator is at least one selected from the group consisting of: transpose operator, reshape operator, broadcast operator, gather operator, reverse operator, concat operator, and cast operator.

14. The artificial intelligence chip according to claim 8, wherein the second operator is at least one selected from the group consisting of: transpose operator, reshape operator, broadcast operator, gather operator, reverse operator, concat operator, flatten operator, cast operator, elementwise binary operator, batch fully connected operator and convolution operator.

15. An electronic device for optimizing computing power of a neural network through a chip and reducing real-time running latency of the neural network for processing data on the chip, comprising:

a memory, configured to store instructions;

a processor, configured to read instructions in the memory and execute a method, wherein the method comprises:

obtaining, by the chip, a computational graph of the neural network having a plurality of operators, wherein each operator among the plurality of operators corresponds to a specific tensor operation executable by the chip;

inputting tensors carrying numerical values of image pixels into the computational graph of the neural network, wherein the numerical values of image pixels are stored in the memory of the chip;

determining, by the chip, a first operator among the plurality of operators, wherein the first operator corresponds to a tensor operation that changes a layout order of numerical values contained in an input tensor but does not change the numerical values themselves in the input tensor;

performing, by the chip based on the specific tensor operation of each operator, at least one adjustment on the first operator, wherein the at least one adjustment on the first operator is performed for merging or cancelling out with other operators in the computational graph to optimize the computational graph, and wherein performing the at least one adjustment on the first operator comprises:

counterchanging a position of the first operator with a subsequent operator or a preceding operator in the computational graph, splitting the first operator into more than two identical operators, and inserting operators on the computational graph, wherein the inserted operators correspond to mutually inverse tensor operations, and each of the inserted operators changes a layout order of numerical values contained in a corresponding tensor but does not change the numerical values themselves in the corresponding tensor;

determining, by the chip based on the specific tensor operation of each operator, a second operator in the computational graph, wherein the second operator is adjacent to the adjusted first operator or the inserted operators, wherein an operation of the adjusted first operator or one of the inserted operators and an operation of the second operator are capable of being merged or canceled out without affecting an operation result;

implementing a merge on the adjusted first operator or the one of the inserted operators and the second operator through a hardware read operation of the chip, wherein the hardware read operation of the chip is configured by the controller of the chip to replace execution of the adjusted first operator or the one of the inserted operators; and generating an output result of the image recognition by executing tensor operations on the image data after implementing the merge of operators in the computational graph to optimize the computing power of the neural network and reduce the real-time running latency of the neural network.

16. A non-transitory computer-readable storage medium, having instructions stored thereon;

wherein, the instructions, when read by a processor, cause the processor to execute the method according to claim 1.

\* \* \* \* \*